United States Patent [19]

Morley et al.

[11] 4,005,388
[45] Jan. 25, 1977

[54] HAND-HELD INTERACTIVE TERMINAL

[75] Inventors: Richard E. Morley, Greenville; George G. Schwenk, Nashua, both of N.H.

[73] Assignee: Termiflex Corporation, Nashua, N.H.

[22] Filed: July 31, 1975

[21] Appl. No.: 600,575

Related U.S. Application Data

[63] Continuation of Ser. No. 417,827, Nov. 21, 1973, abandoned.

[52] U.S. Cl. .................. 340/172.5; 340/365 R; 340/365 S
[51] Int. Cl.² .................. G06F 3/02; G06F 3/04; G06F 3/14; G08C 1/00
[58] Field of Search ........ 340/172.5, 149 R, 149 A, 340/152 R, 365 R, 365 S; 179/2 DP, 2 CA, 90 K; 178/17 C, 17.5, 79, 81, 21; 197/9, 11, 72, 98 R

[56] References Cited

UNITED STATES PATENTS

| | | | |
|---|---|---|---|
| 2,581,665 | 1/1952 | Jarmann | 340/365 R |
| 3,022,878 | 2/1962 | Seibel | 340/365 R |
| 3,319,884 | 5/1967 | Franklin | 340/365 R |
| 3,381,276 | 4/1968 | James | 340/172.5 |
| 3,389,404 | 6/1968 | Koster | 340/172.5 |
| 3,403,225 | 9/1968 | Mislan | 340/172.5 |
| 3,428,747 | 2/1969 | Alferieff | 340/365 R |
| 3,500,327 | 3/1970 | Belcher | 340/172.5 |
| 3,526,892 | 9/1970 | Bartlett | 179/2 DP |
| 3,571,802 | 3/1971 | Serra | 340/172.5 |
| 3,675,513 | 7/1972 | Flanagan | 179/2 DP |
| 3,680,077 | 7/1972 | Huberecht | 340/172.5 |
| 3,728,710 | 4/1973 | Berg | 340/152 |
| 3,753,233 | 8/1973 | Cardell | 340/172.5 |

OTHER PUBLICATIONS

"Input Keyboard", P. E. Stuckert, *IBM Technical Disclosure Bulletin,* vol. 14, No. 3, Aug. 1971, pp. 952–959.

*Primary Examiner*—Gareth D. Shaw
*Assistant Examiner*—James D. Thomas
*Attorney, Agent, or Firm*—Mattern, Ware, Davis & Stoltz

[57] ABSTRACT

An interactive computer terminal which is capable of complete hand-held operation with total freedom of position and location is provided. The terminal incorporates a self-contained full 75-character keyboard, a 20-character alpha numeric readout, and a 100-character memory. In order to assure review of any message, a conveniently positioned scroll switch is incorporated to advance or roll back any message in the memory for presentation on the display. The unique, totally portable hand-held interactive terminal is provided with a 20-key pad which is operated with one hand, while the other hand selects one of four different information levels for each key. Consequently, each of the 20 keys is capable of transmitting four different characters or other information, thereby assuring easy, compact transmission of all numeric, alphabetic, and punctuation characters with sufficient keyboard room available for command capability.

32 Claims, 50 Drawing Figures

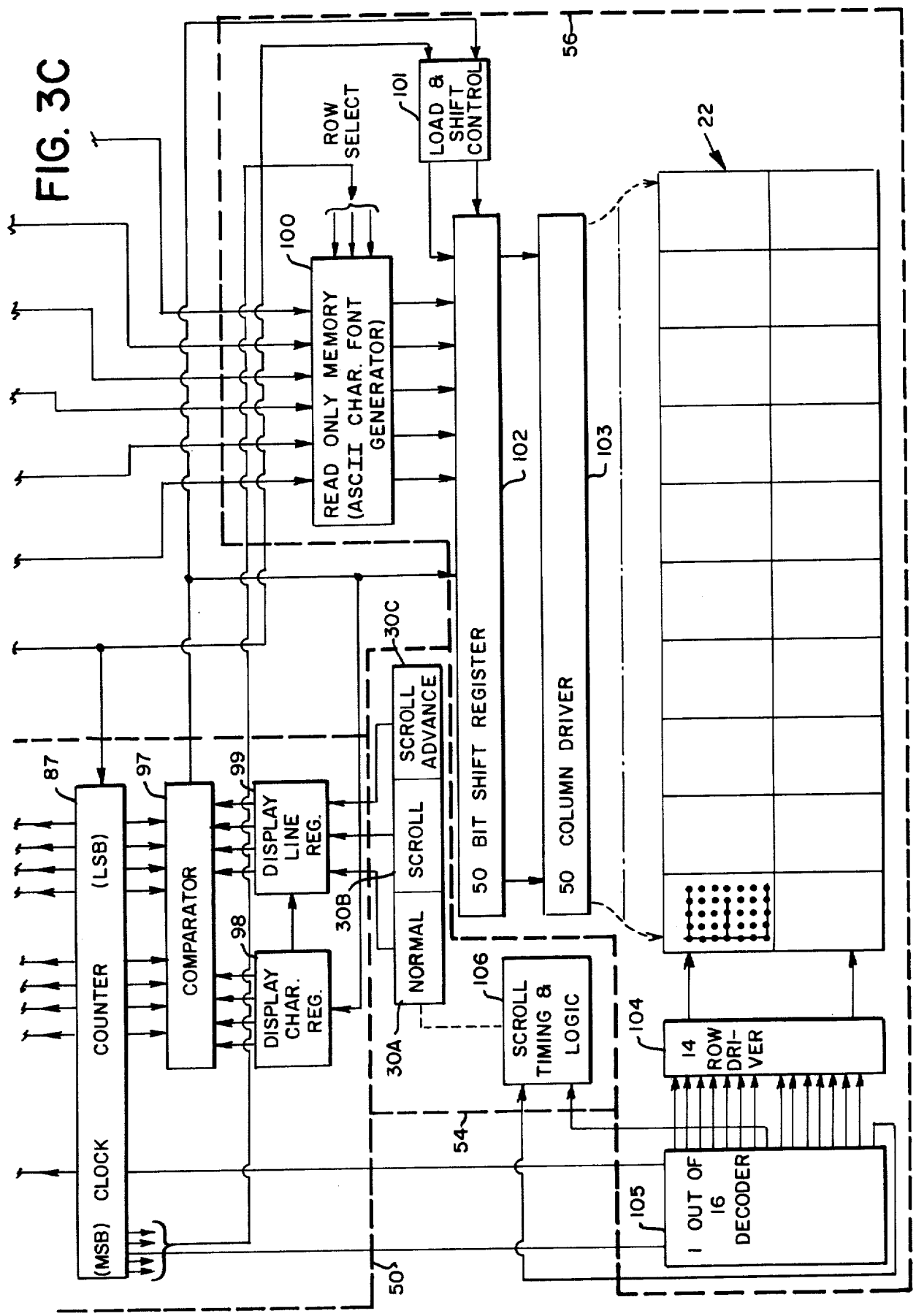

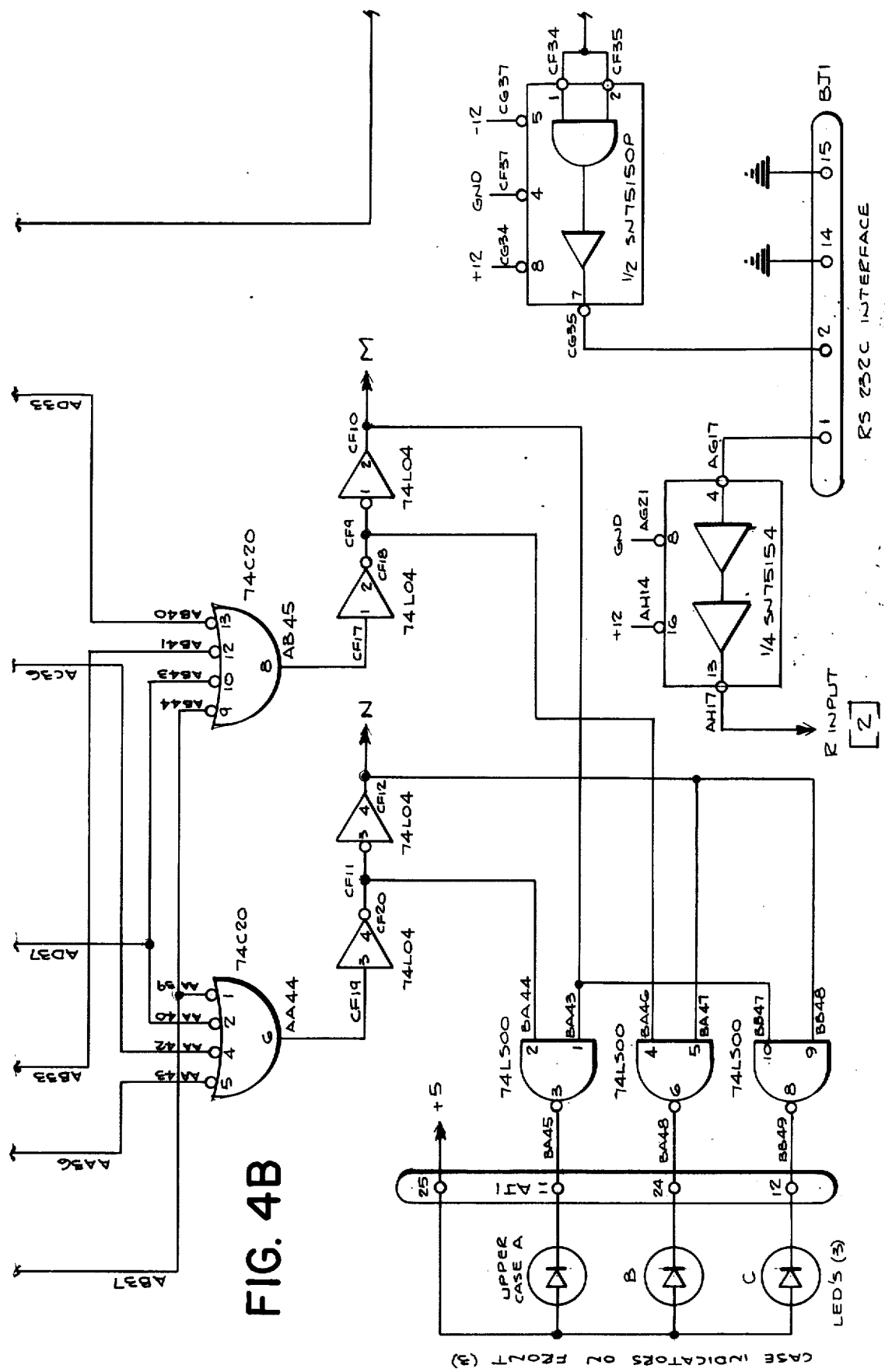

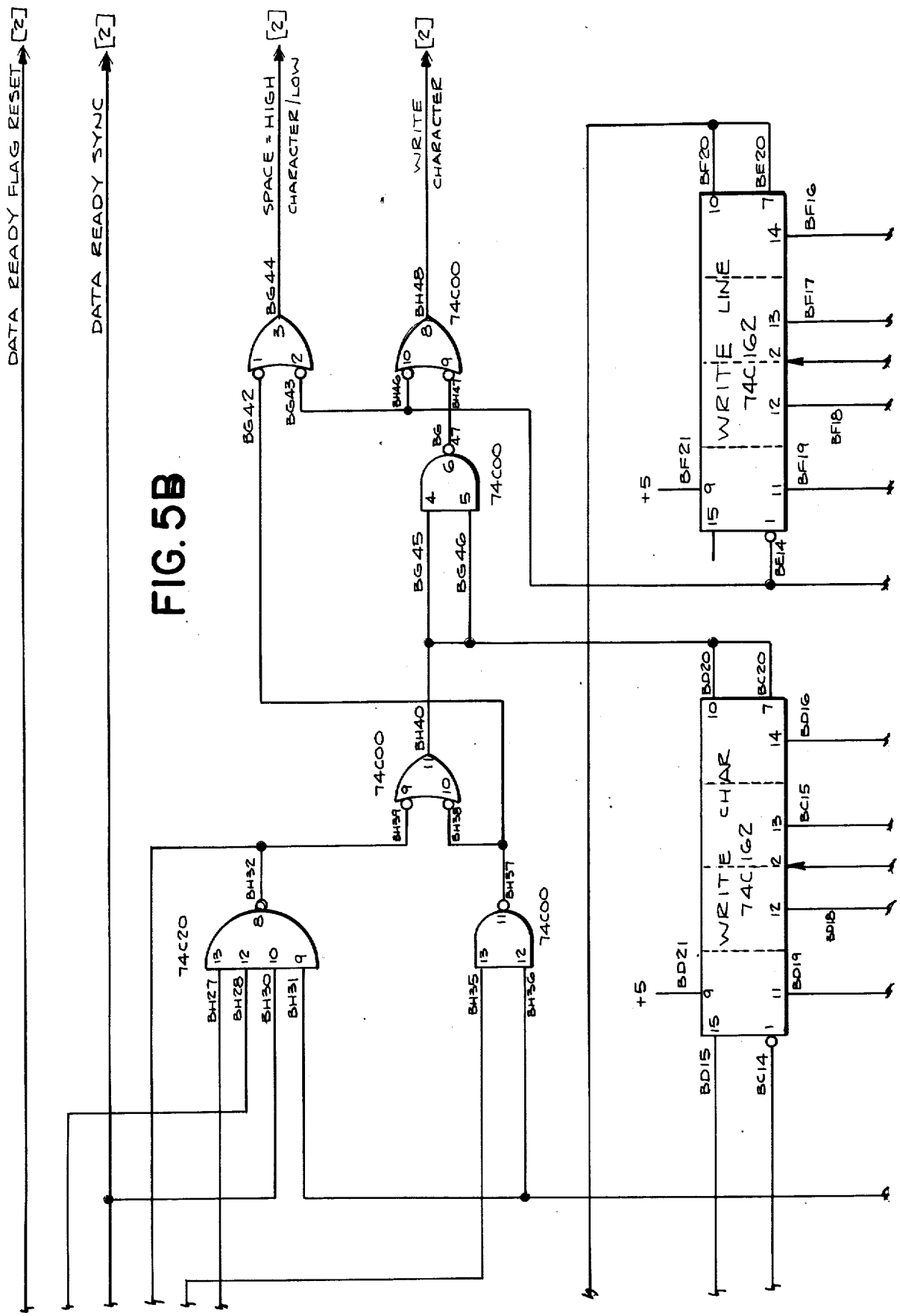

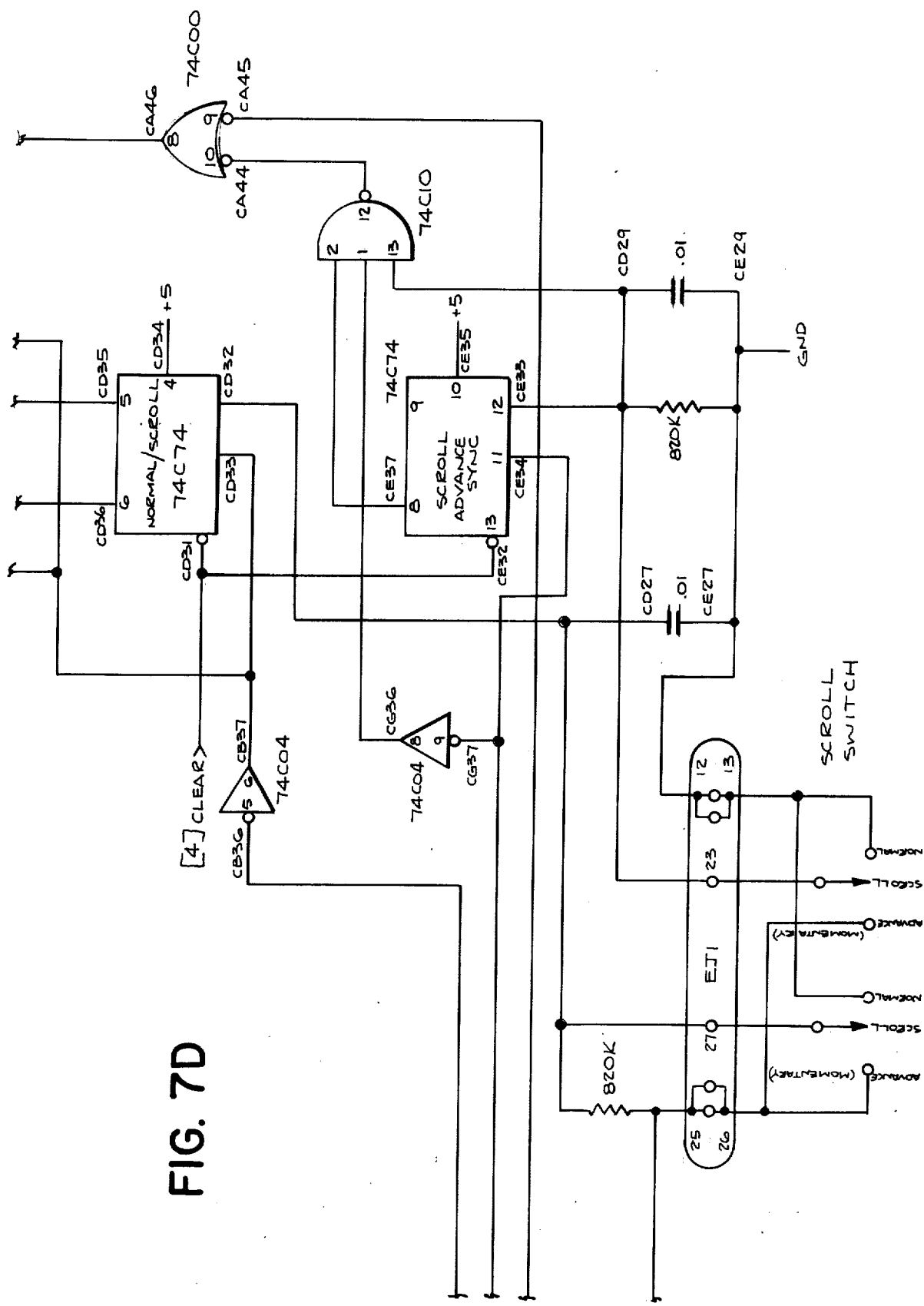

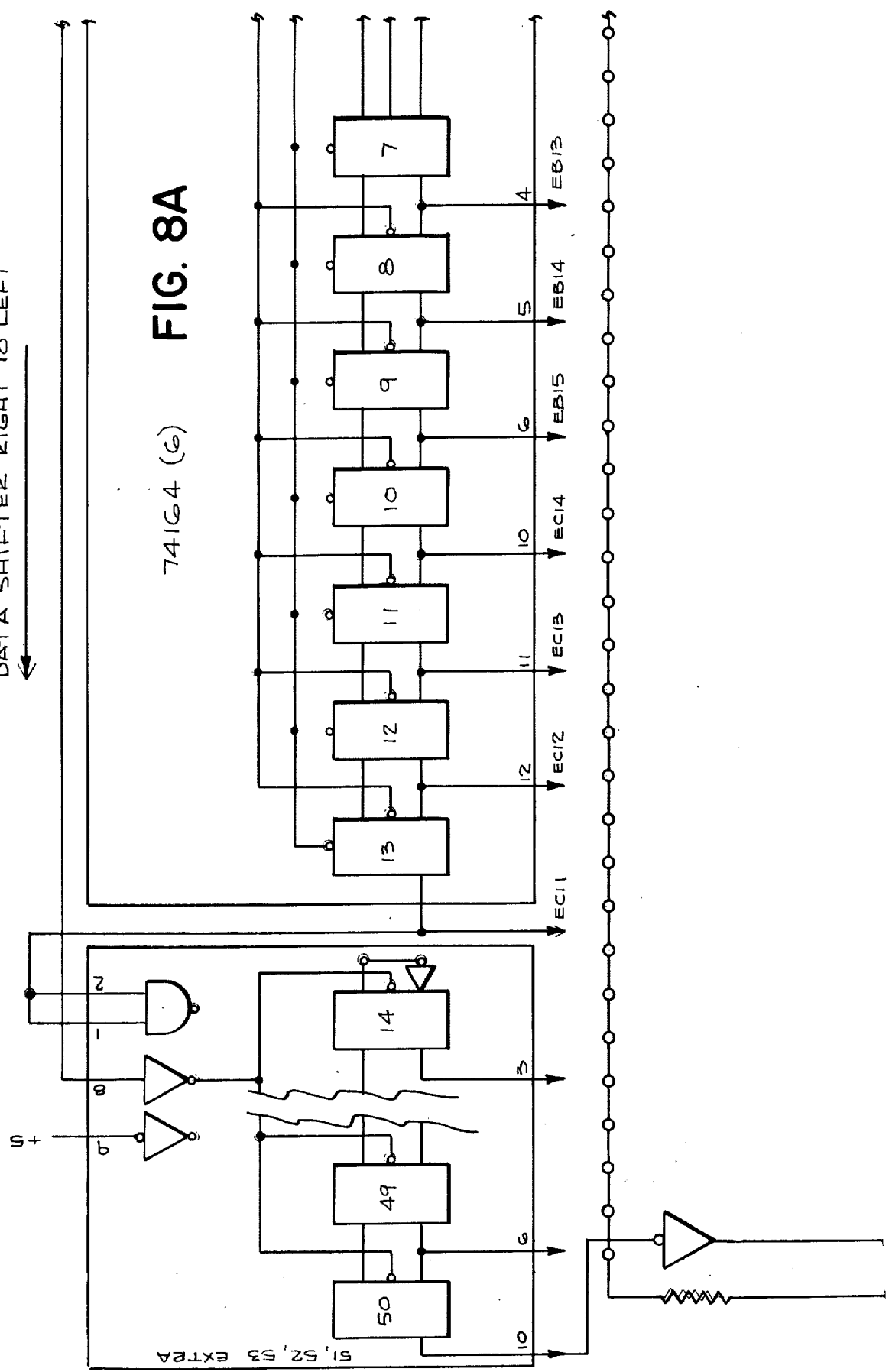

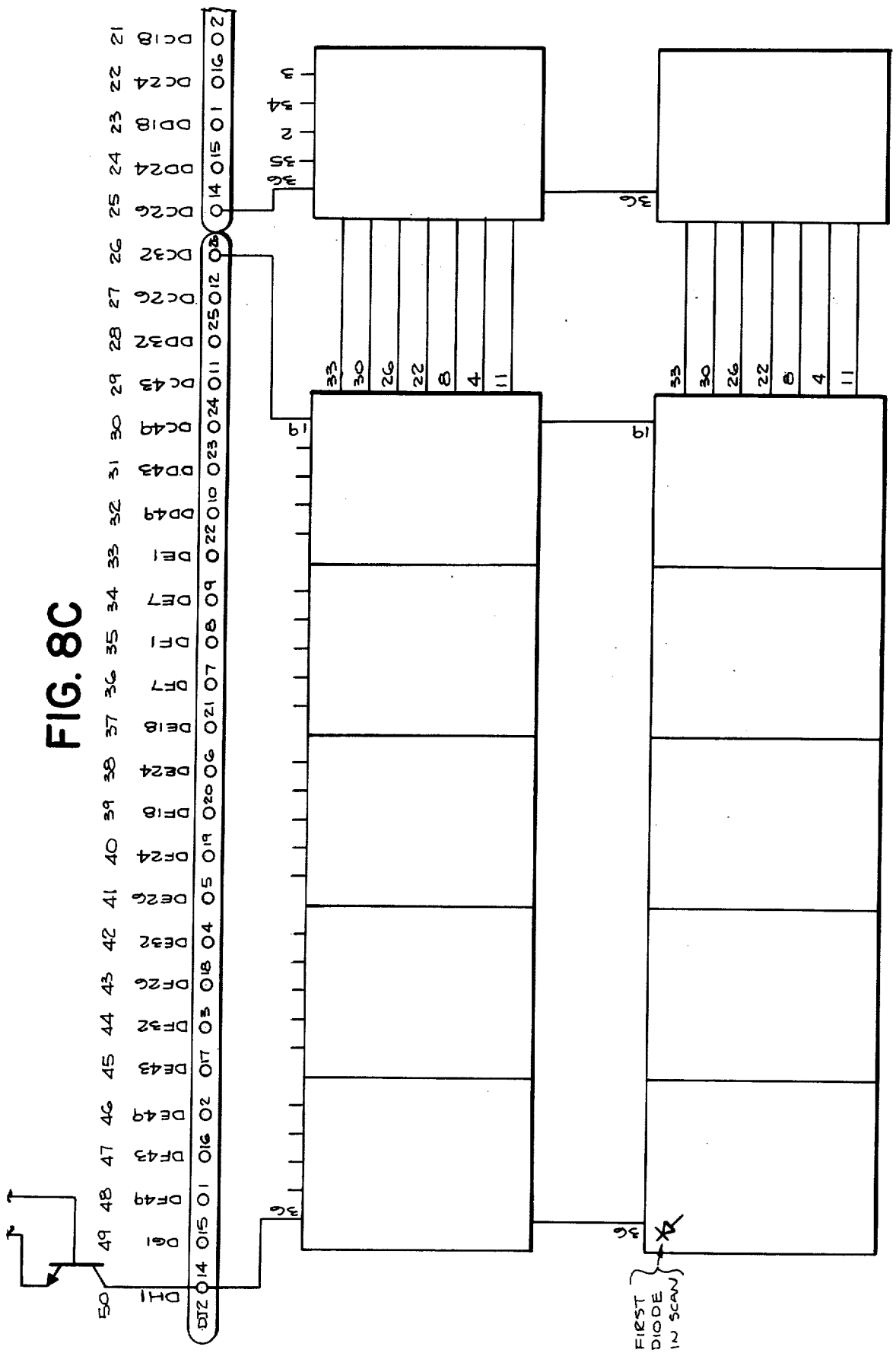

HAND-HELD INTERACTIVE TERMINAL

This is a continuation of application Ser. No. 417,827 filed Nov. 21, 1973, now abandoned.

SUMMARY OF THE INVENTION

This invention relates to interactive computer terminals, and more particularly to interactive terminals which are completely portable or capable of being hand held and operated.

Most computer terminals known in the art require a fixed position and a specific location. Generally, they are as large as a suitcase, and certainly not capable of being portable or hand held. Such a cumbersome arrangement prevents flexibility in position and requires placement of the computer terminal in a location which is convenient to its operation.

It is a principal object of this invention to provide an interactive computer terminal which is completely capable of being operated while being held in the operator's hand.

Another object of this invention is to provide a computer terminal of the above character, which is completely silent in its operation.

Another object of this invention is to provide a computer terminal of the above character capable of providing all of the functions which the larger, more cumbersome computer terminals are capable of providing.

A further object of this invention is to provide a computer terminal of the above character which incorporates a self-contained alpha-numeric display and capability of reviewing the messages entered or received by the computer terminal.

The computer terminal of this invention incorporates a 20-character alpha-numeric display, a 100-character memory, and a full 75-character keyboard capability on a 20-key pad. The entire self-contained silent computer terminal can be held in one hand, while the other hand operates the 20-key pad. Each key is capable of transmitting four different characters or commands by selection of a particular information level in which the character or command resides.

In the preferred embodiment, three information transmission level shift keys are located on the side of the hand-held terminal, and are operated by the hand holding the terminal. Each key is capable of selecting one information level for transmission, while the failure to depress any one of these shift keys results in the transmission of the fourth information level. As a result, each of 20 keys on the keyboard has a capability of transmitting four different characters or other information. Consequently, 80 characters or command signals can be transmitted simply and easily by the small 20-key pad.

The hand-held silent interactive computer terminal also incorporates a self-contained memory which is capable of storing at least ten lines of information. Associated with the memory storage is a scroll switch to allow changing the display to present to the operator in sequential order all of the information stored in the memory. As would be obvious to one skilled in the art, the size of the alpha-numeric display and the storage capability of the memory can be easily varied, depending upon the size limitations required for providing a conveniently sized hand-held terminal.

The hand-held terminal of this invention is capable of receiving and transmitting data to a computer, or teletype receiver, by simply coupling the hand-held computer terminal of this invention to well-known equipment existing in the art. In one embodiment, the hand-held computer terminal of this invention can be simply plugged into well-known "Modem" telephone link equipment which is capable of communicating with either a computer or a teletype. In another embodiment, the hand-held computer terminal can be merely connected to a power source and its associated electronics, which then is directly connected to a teletype. In still a further embodiment of this invention, the hand-held computer terminal can be connected to a battery-operated radio frequency emitter capable of transmitting the signal to a receiver associated with a telephone link, teletype power source, or directly with a computer. In still a further embodiment of this invention, the hand-held computer terminal can incorporate the battery-operated radio frequency emitter within the terminal itself, thereby providing complete transmission from any location with absolute freedom of movement, the only requirement for transmission of signals being that the operator be located within the frequency pick-up range of the receiving source.

As would be rapidly obvious to one skilled in the art, the ability to have a hand-held interactive computer terminal completely portable and operable by two hands without any confinement to position and location provides an enormous number of possibilities for various important uses of this invention. The flexibility which is now provided by the hand-held computer terminal of this invention provides limitless potential application for such a convenient and novel step forward in the development of this art.

The invention accordingly comprises the features of construction, combinations of elements, and arrangement of parts which will be exemplified in the construction hereinafter set forth, and the scope of the invention will be indicated in the claims.

THE DRAWINGS

For a fuller understanding of the nature and objects of the invention, reference should be had to the following detailed description, taken in connection with the accompanying drawings, in which.

Figure 1:
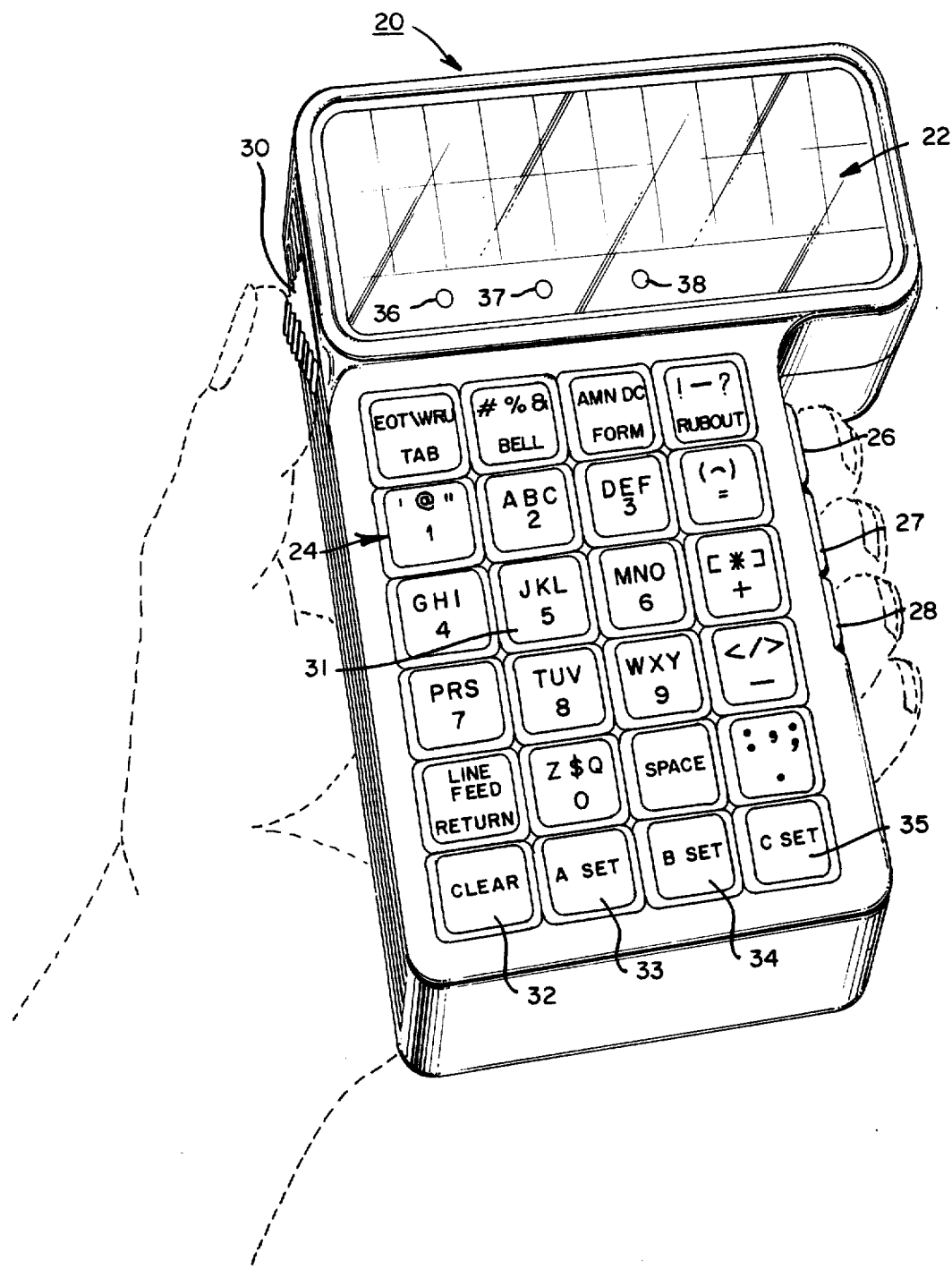
FIG. 1 is a perspective view of the interactive hand-held computer terminal of this invention.
Figure 2:
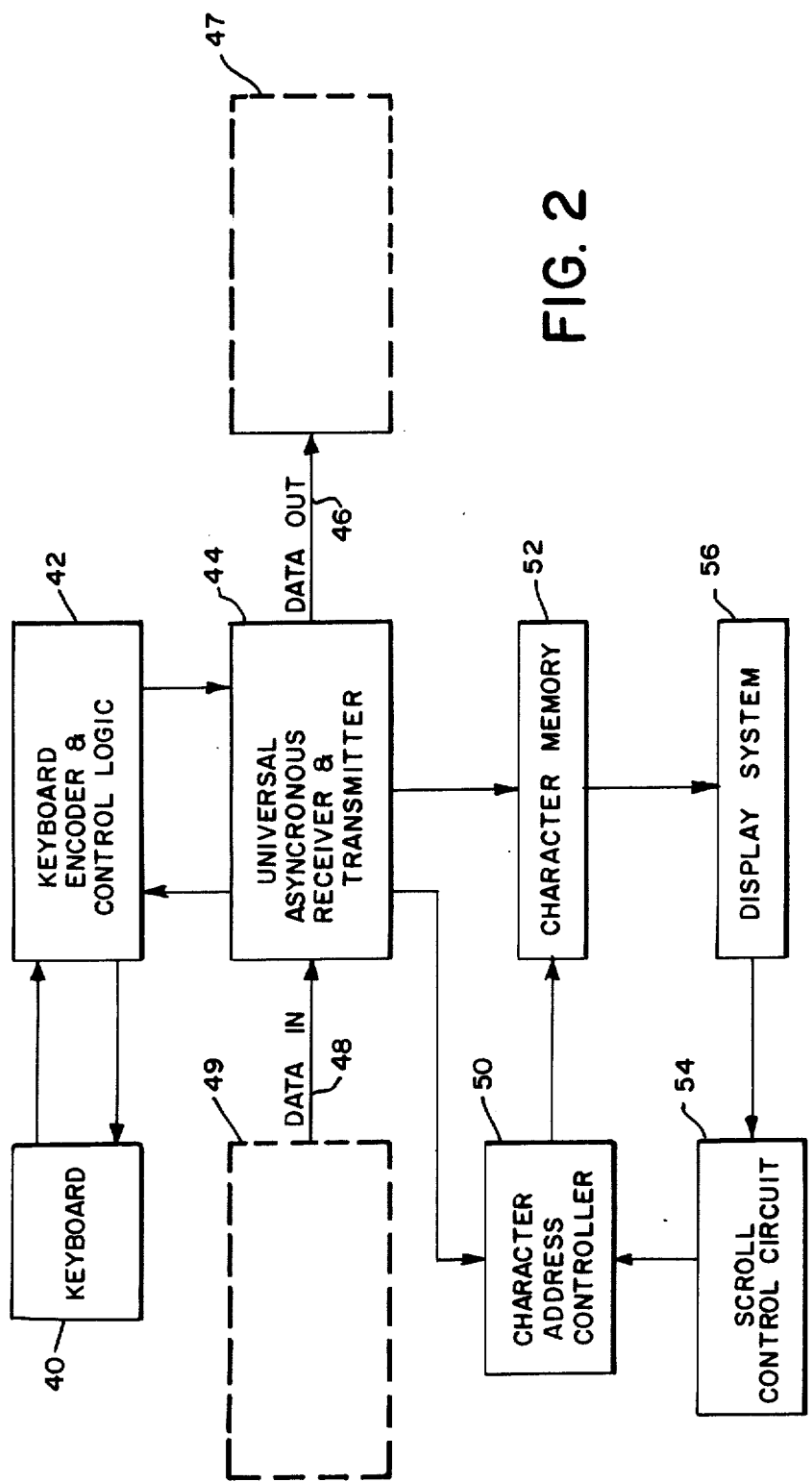
FIG. 2 is a block diagram showing the operation of the terminal of this invention.
Figure 6:
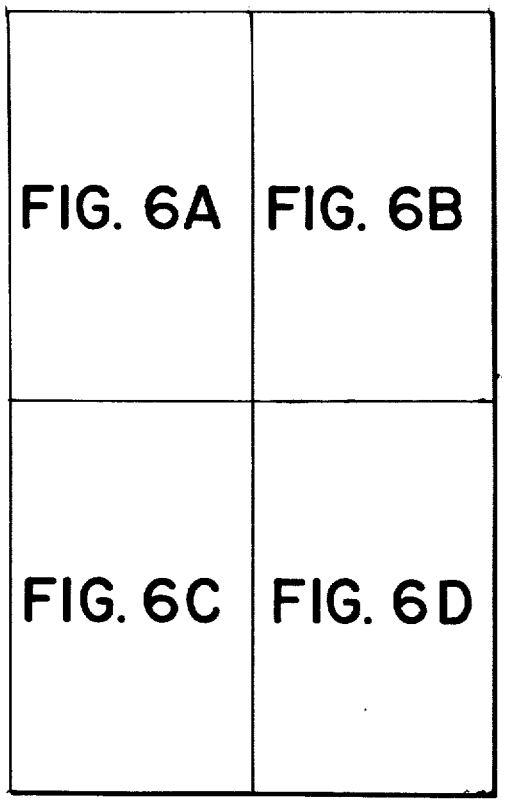
Figure 3:
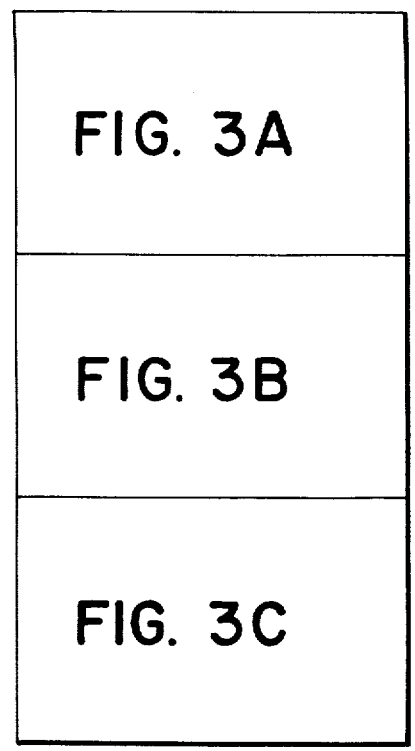
Figure 7:
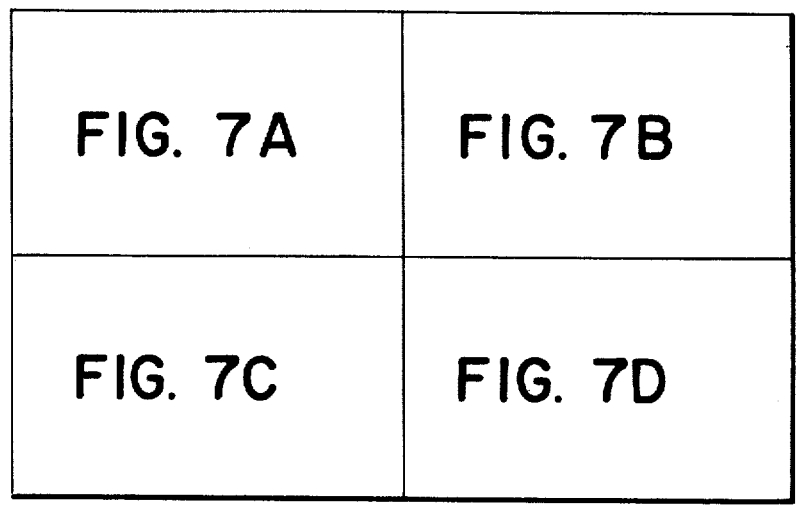
Figure 3A:
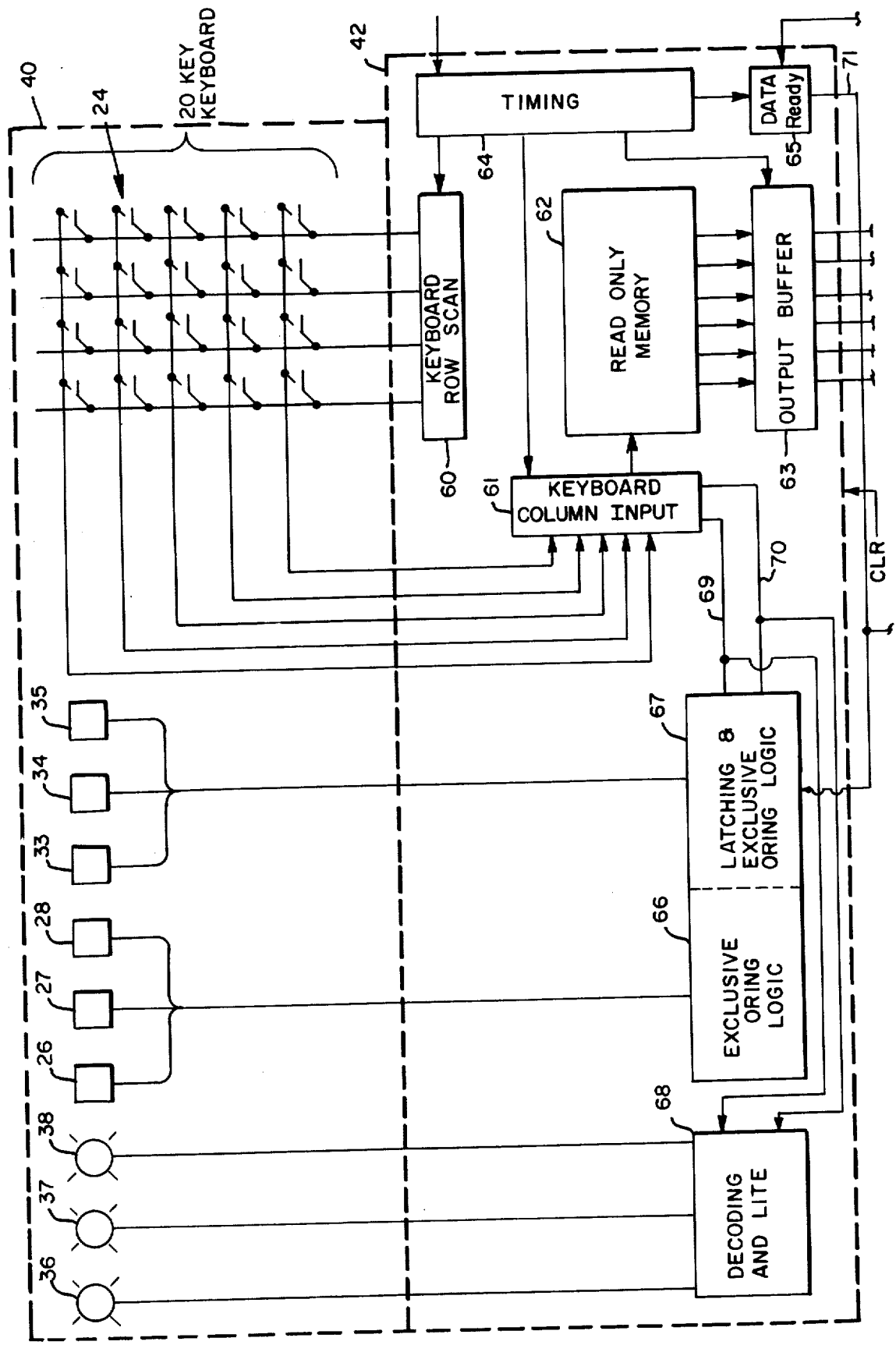
Figure 3B:
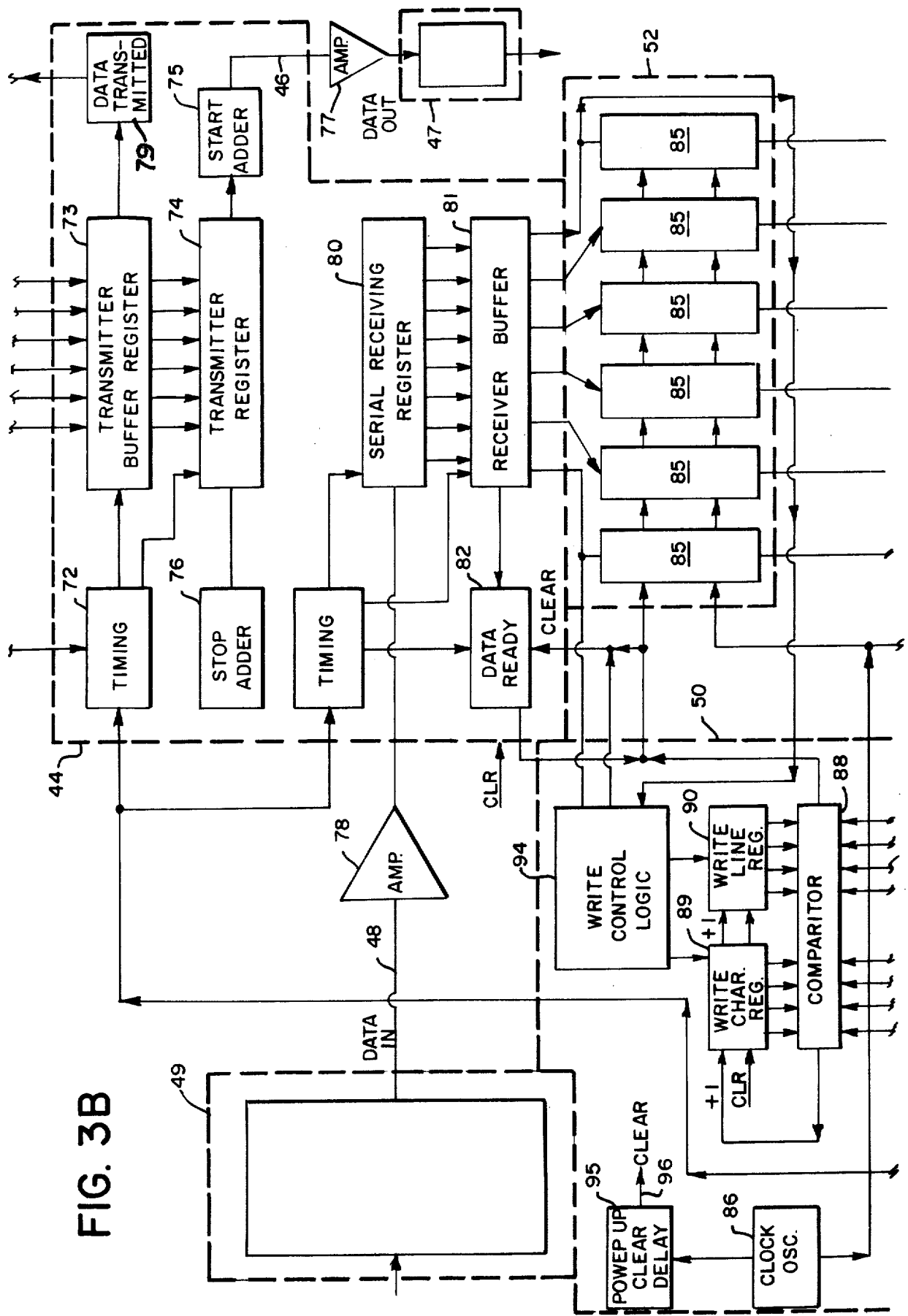
Figure 4:
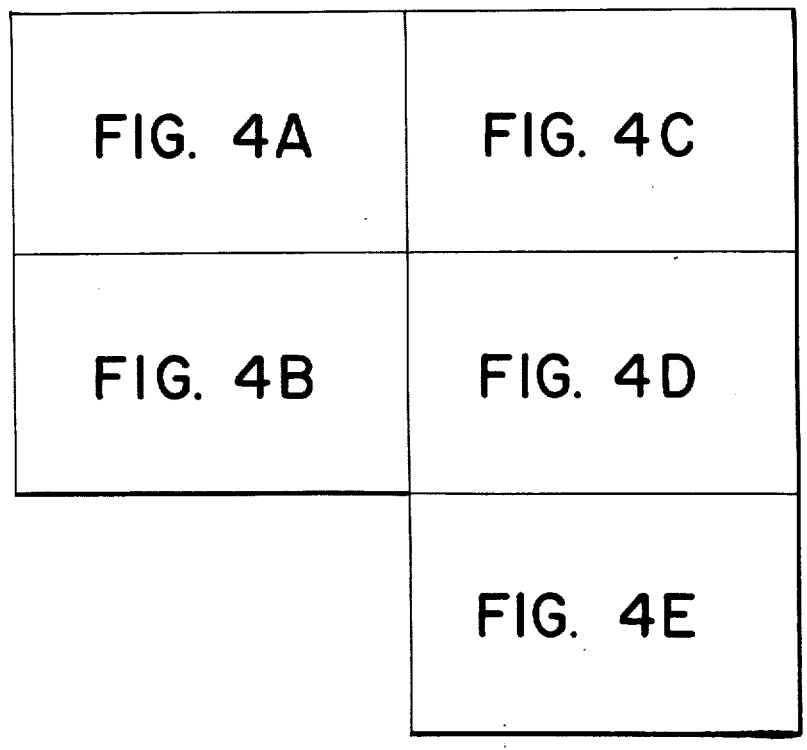
Figure 5:
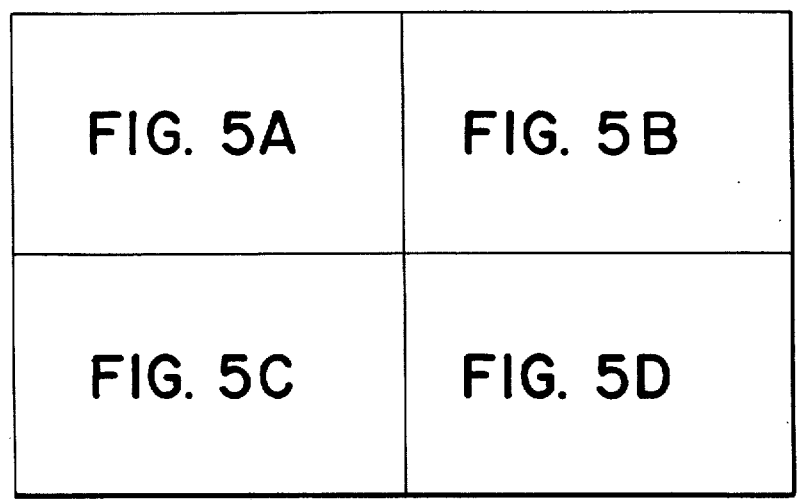
Figure 4A:
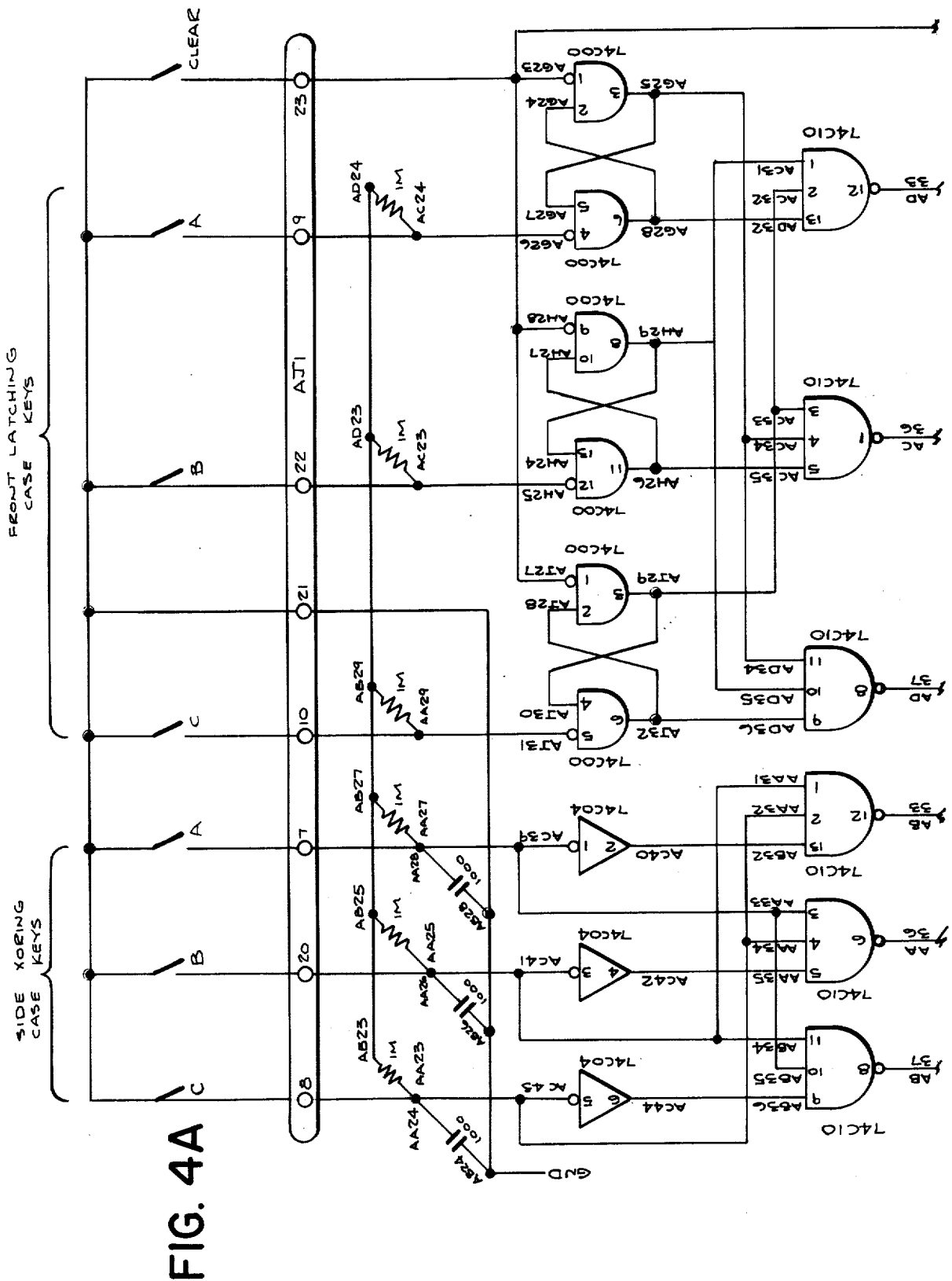
Figure 4C:
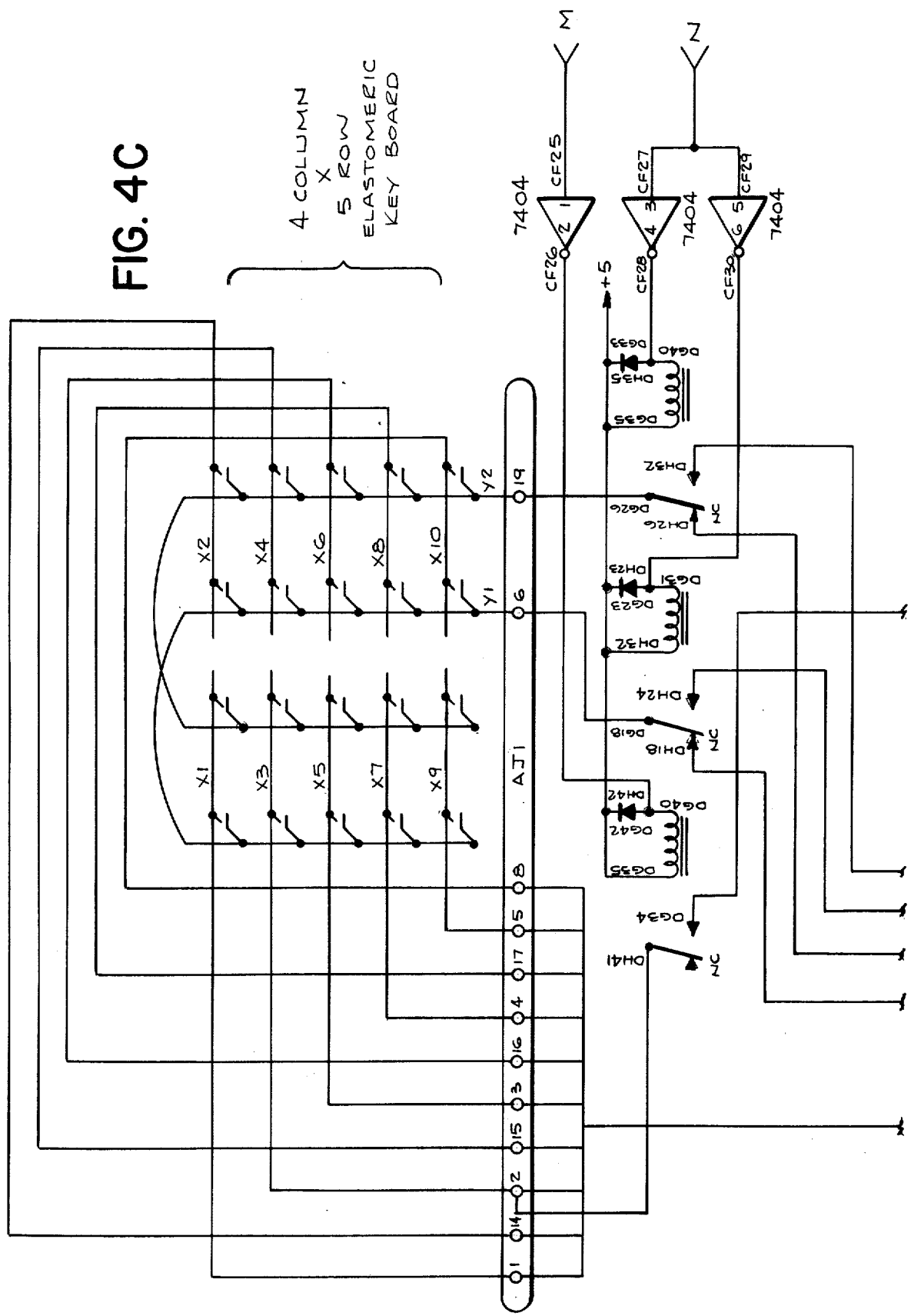
Figure 4D:
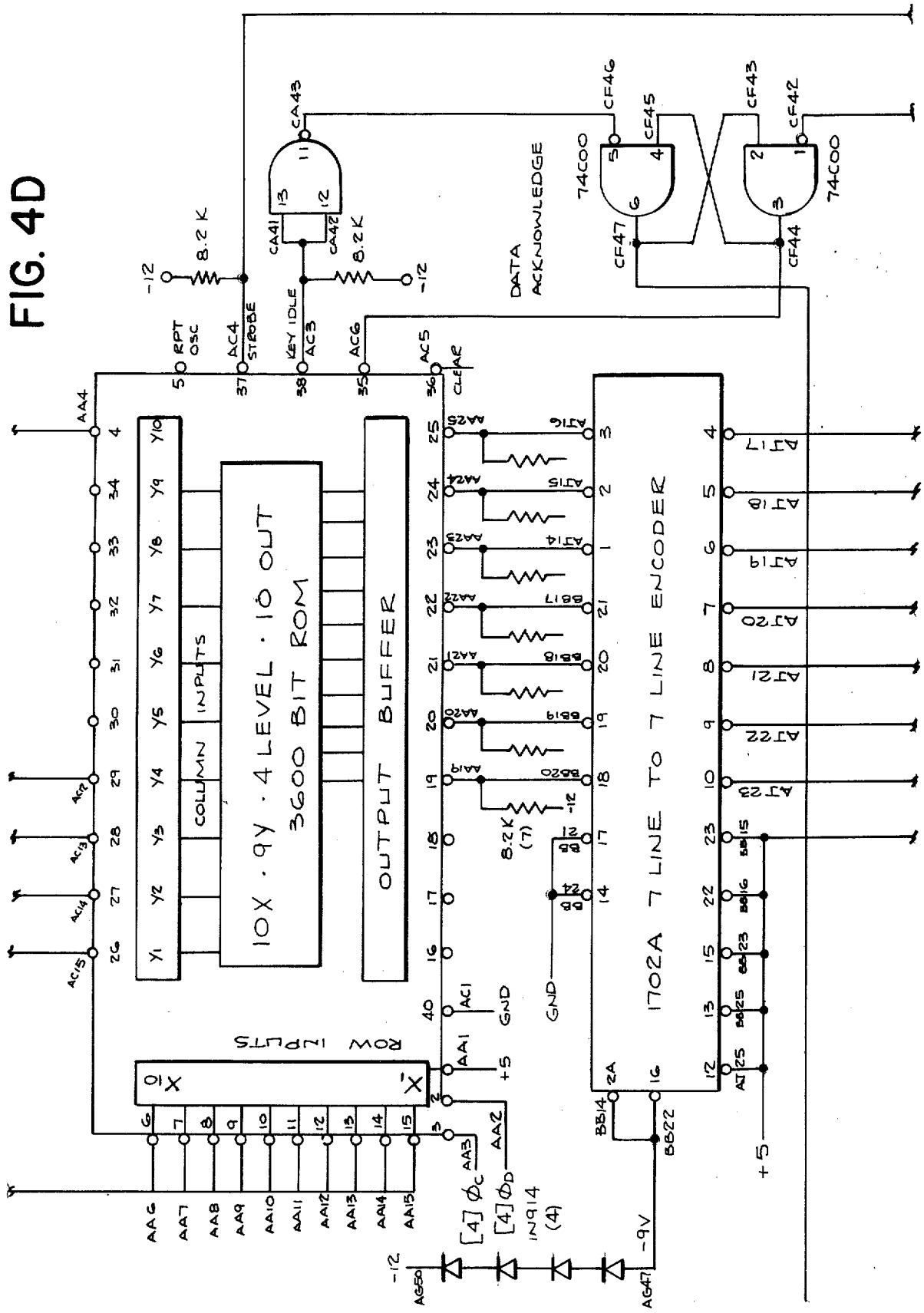
Figure 4E:
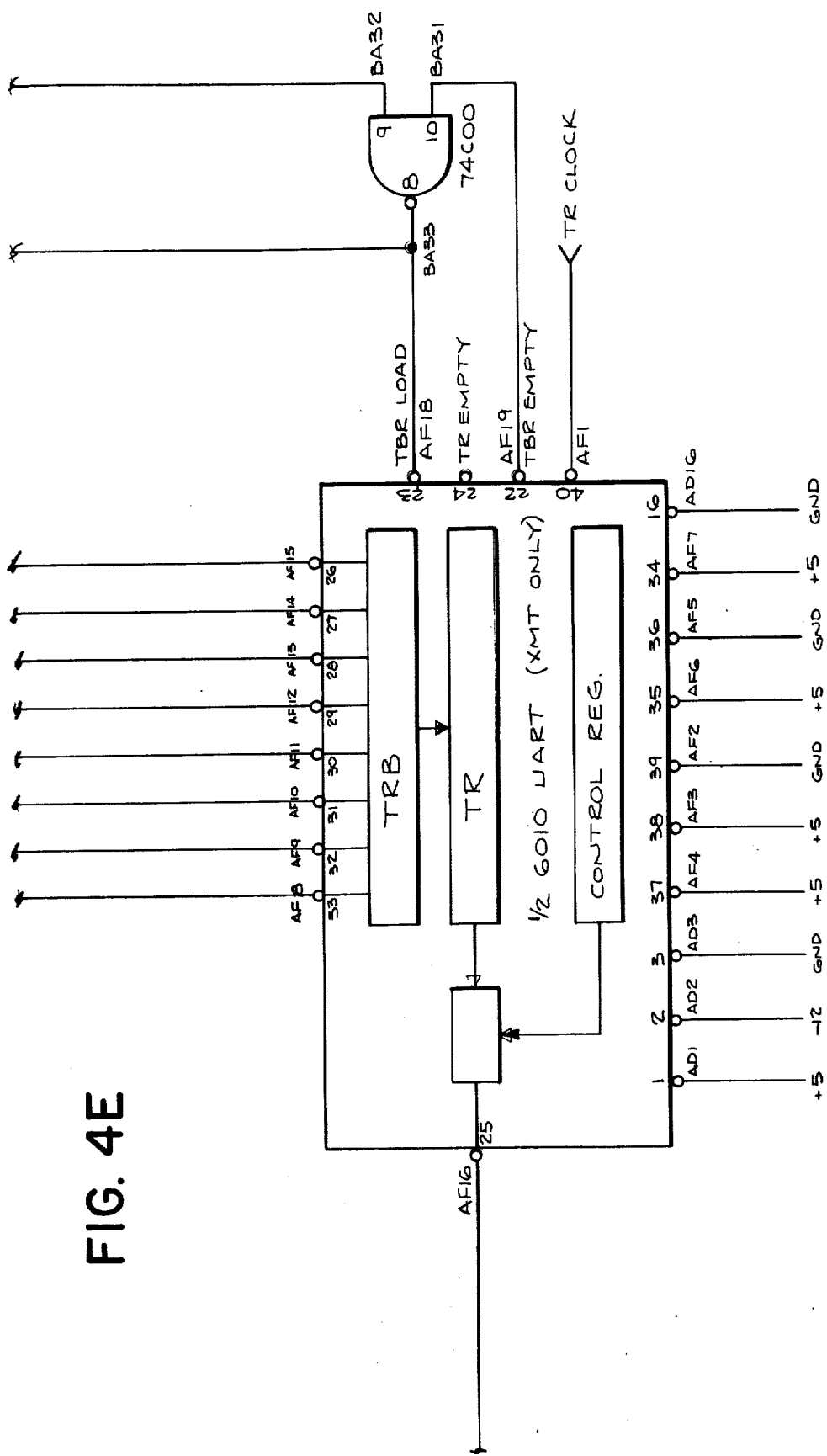
Figure 5A:
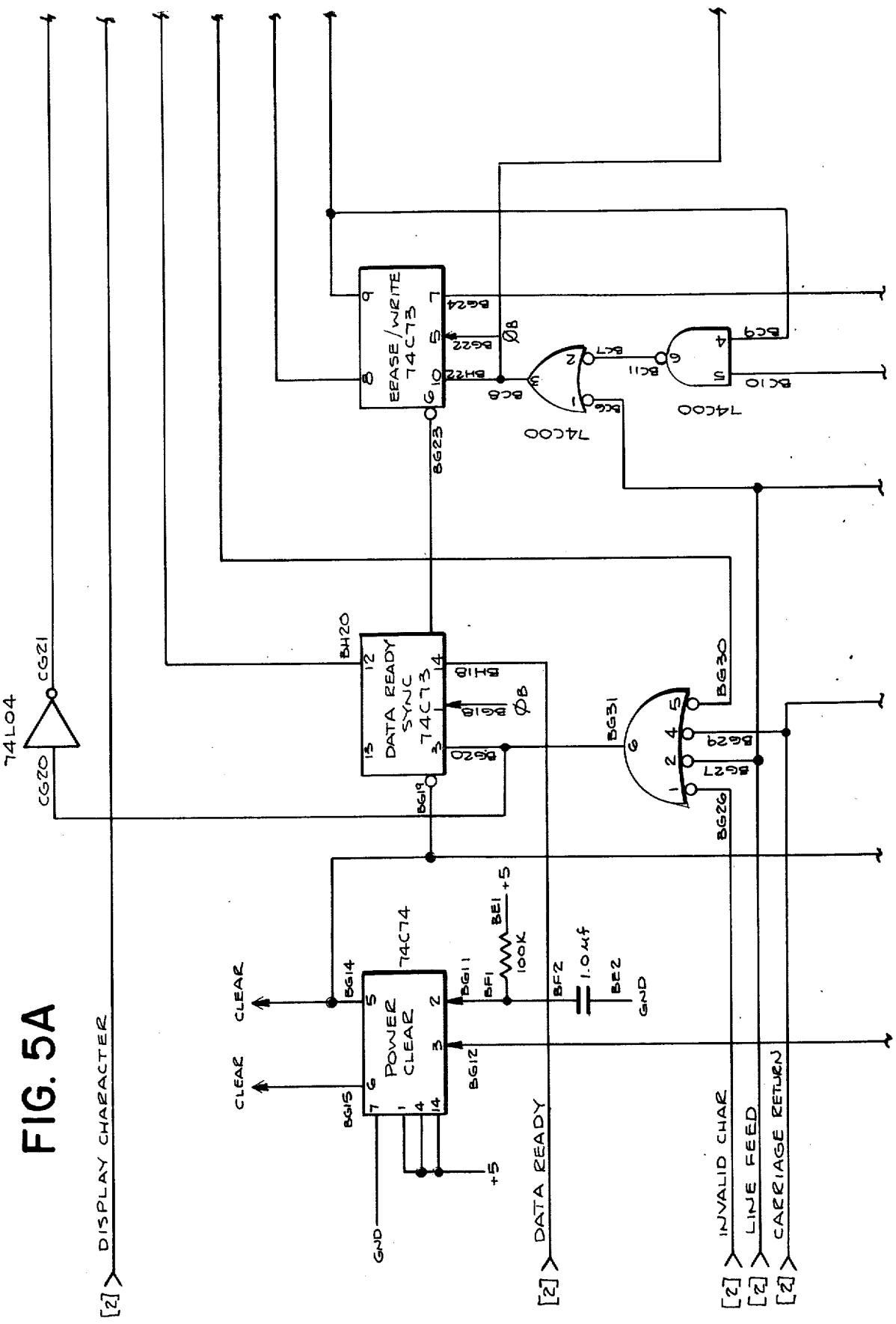
Figure 5C:
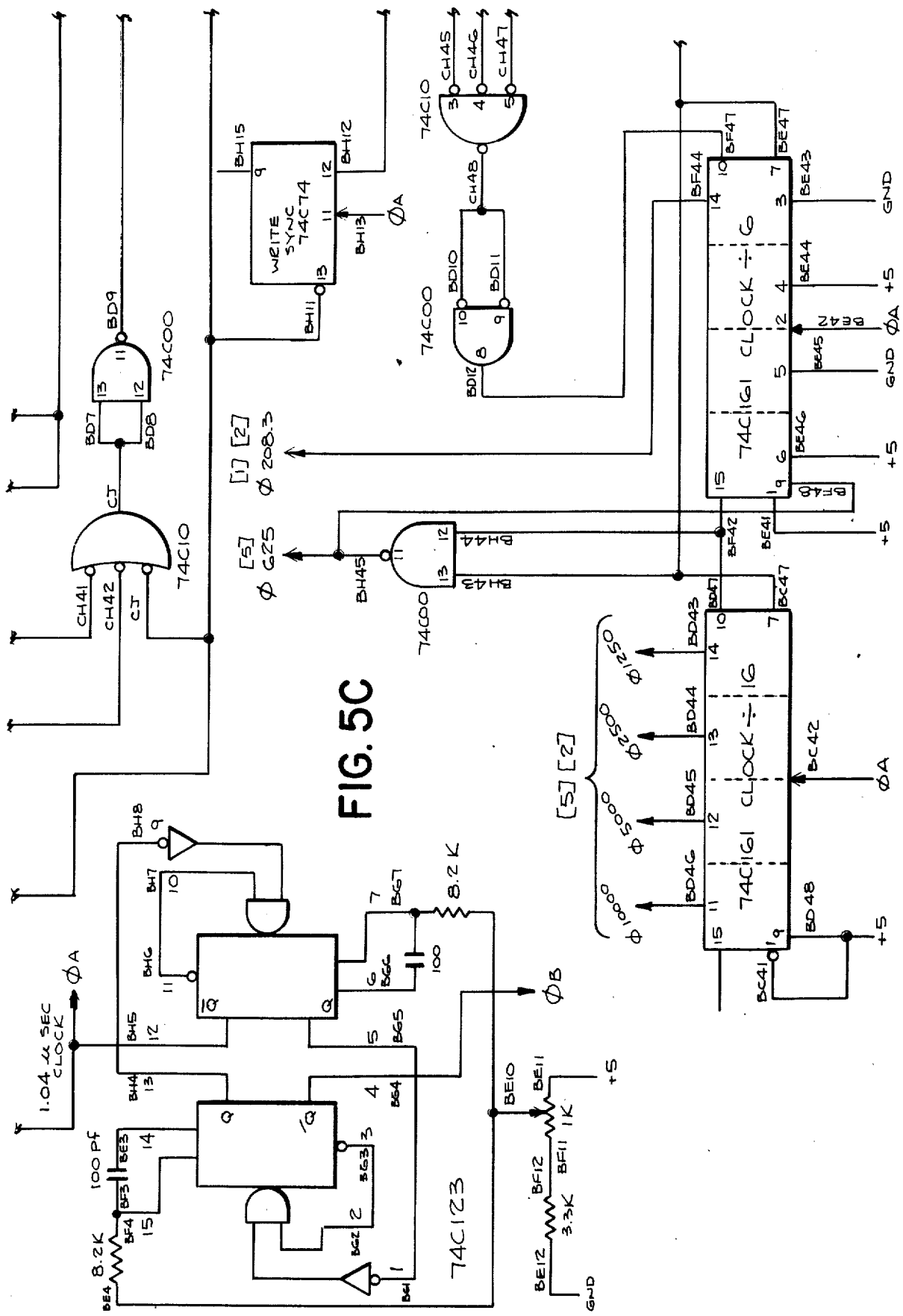
Figure 5D:
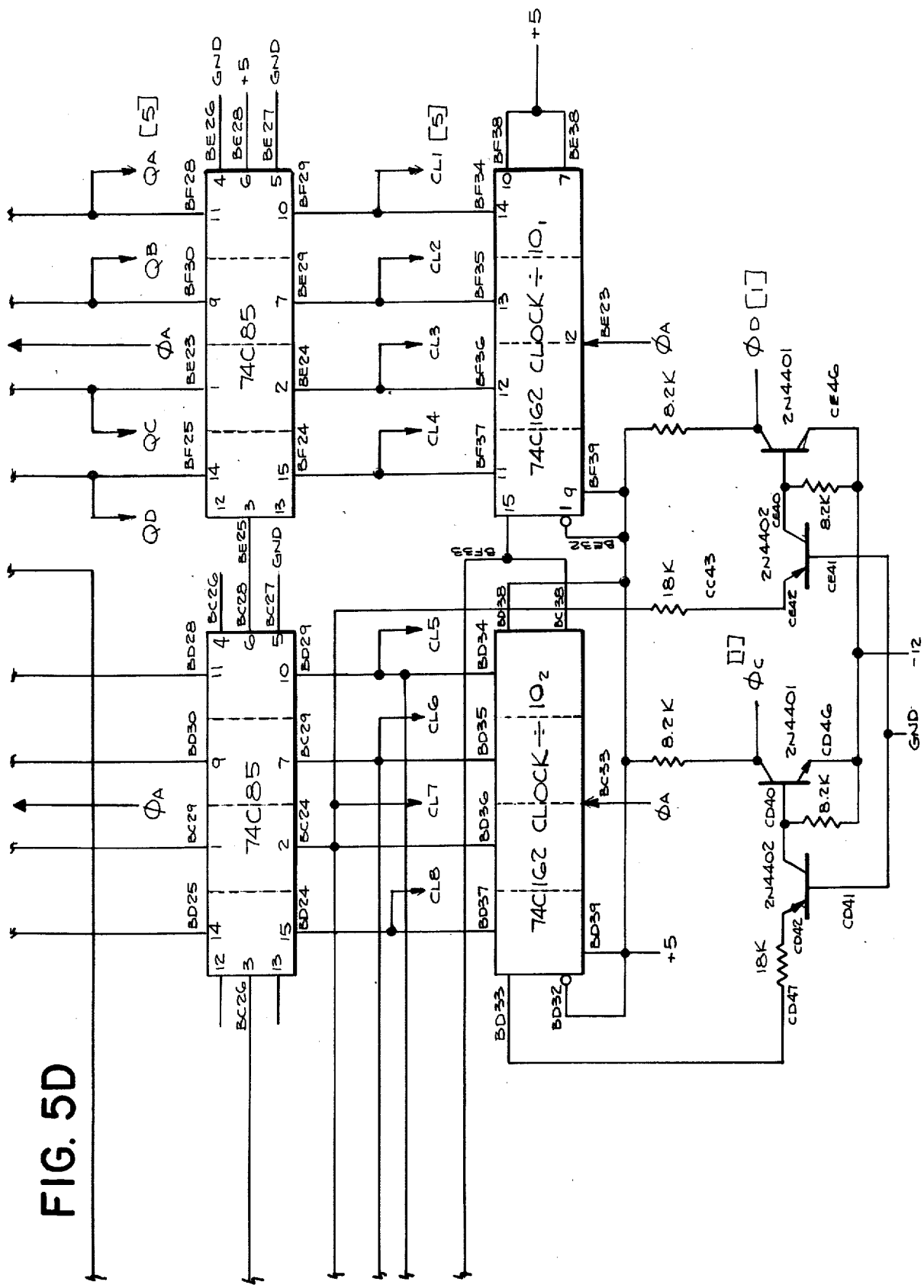
Figure 6A:
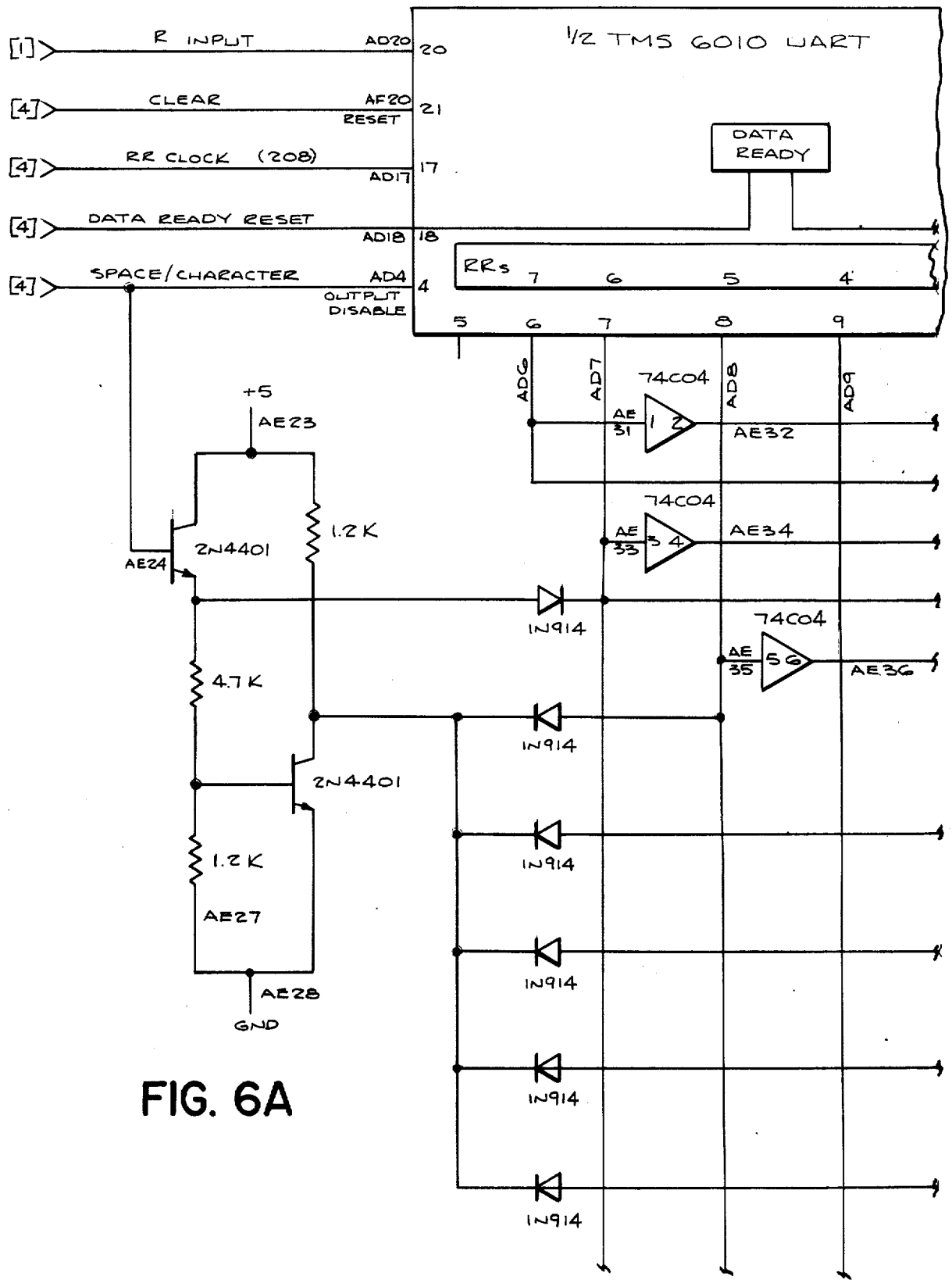
Figure 6B:
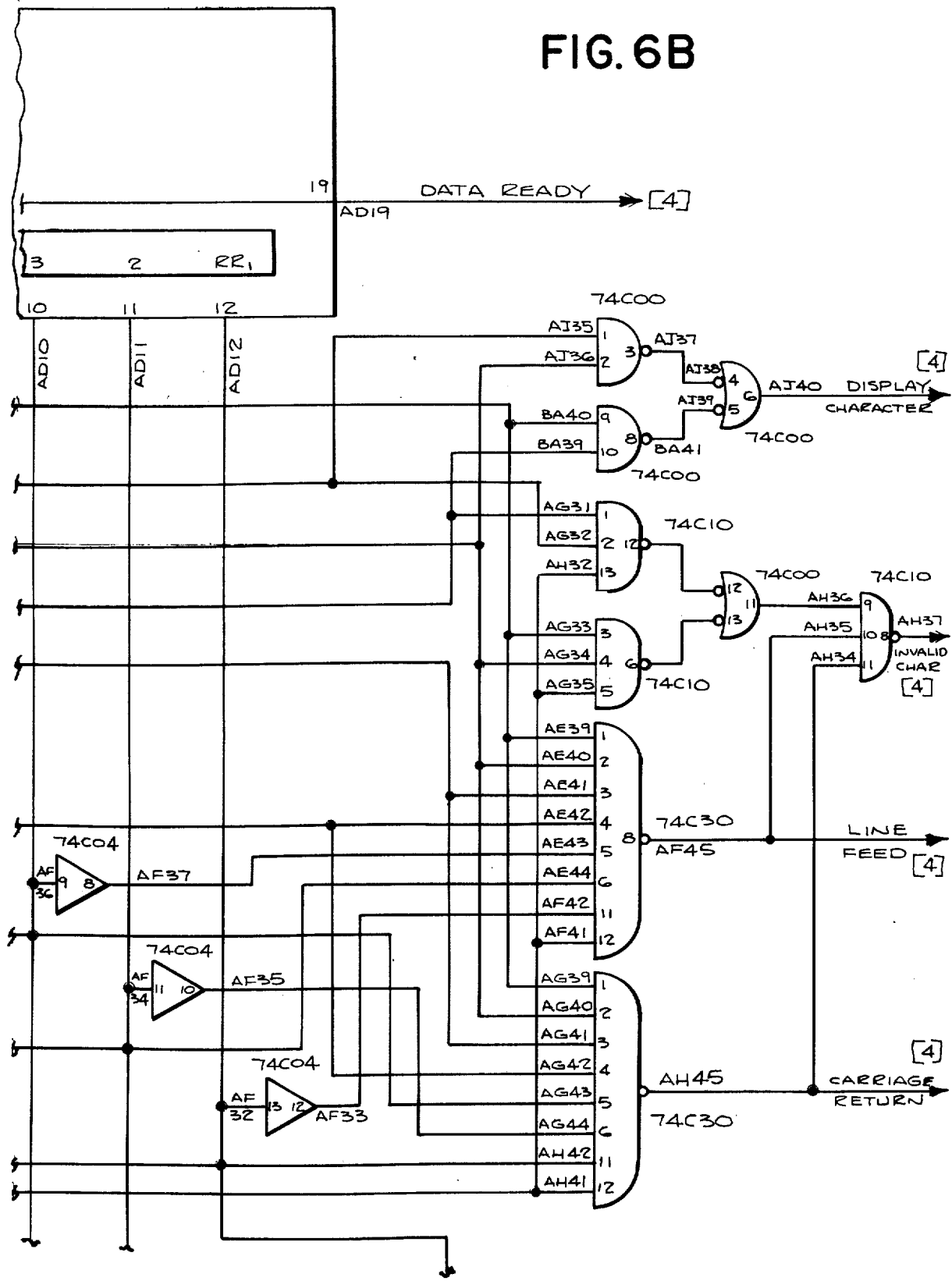
Figure 6C:
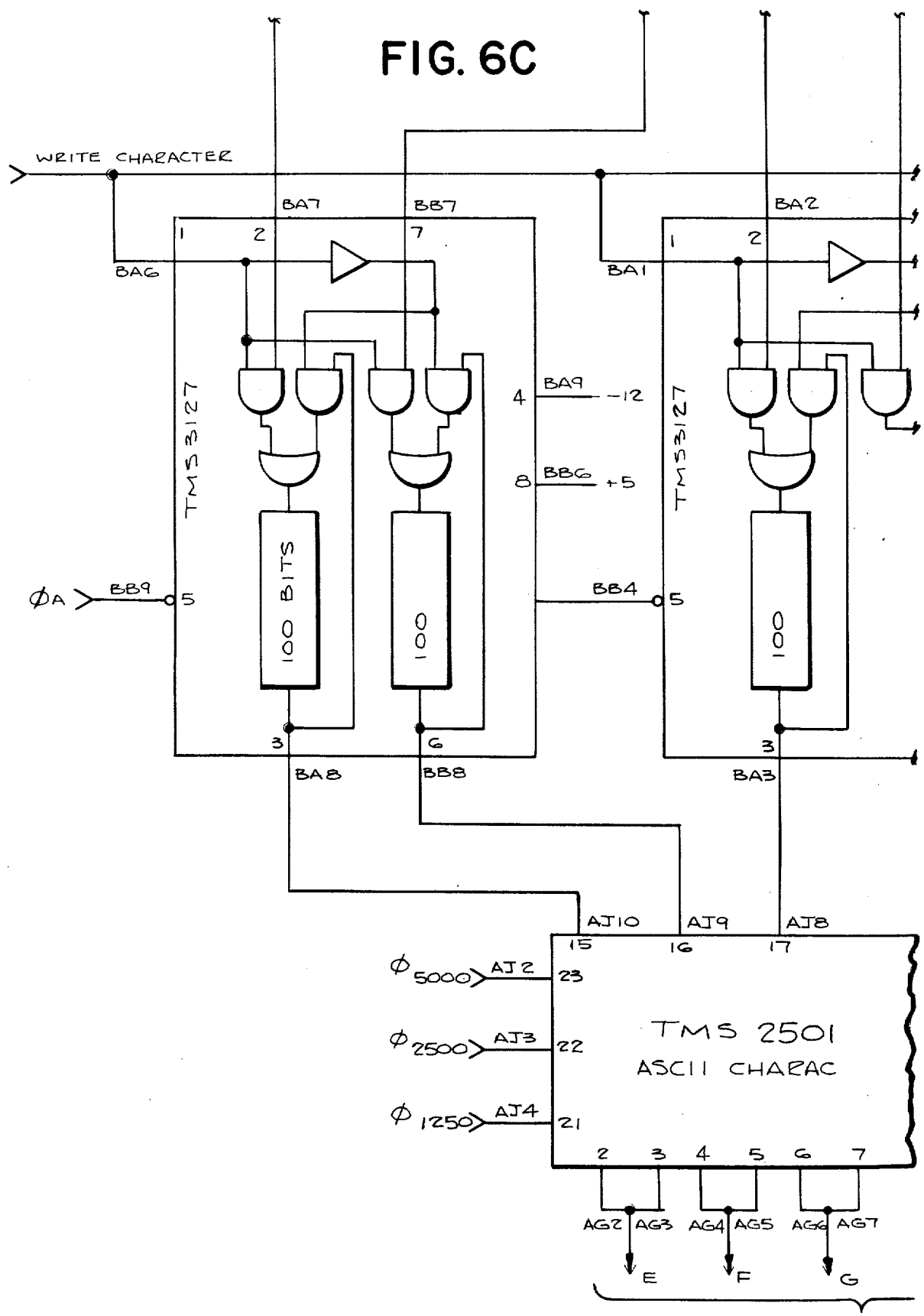
Figure 6D:
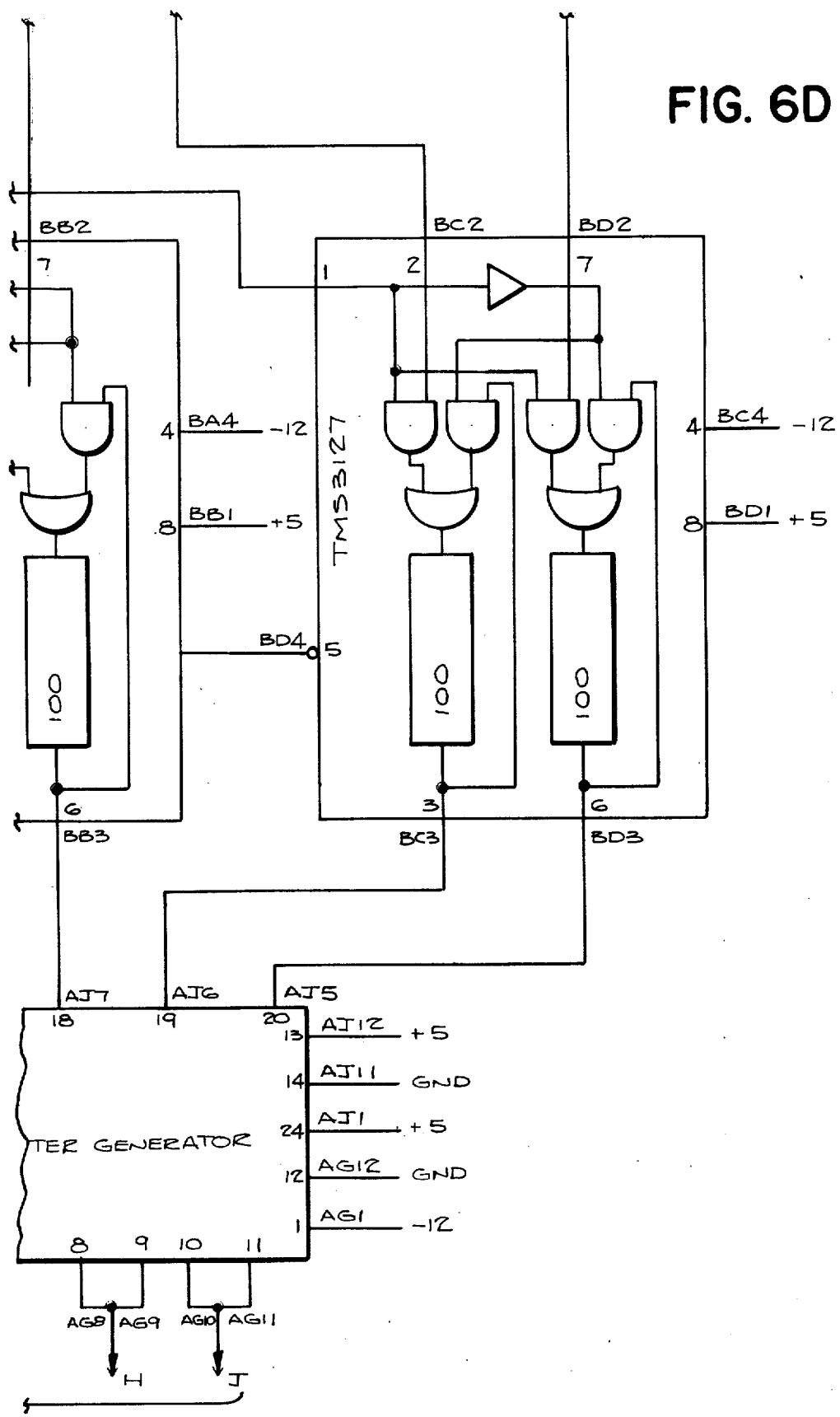
Figure 7A:
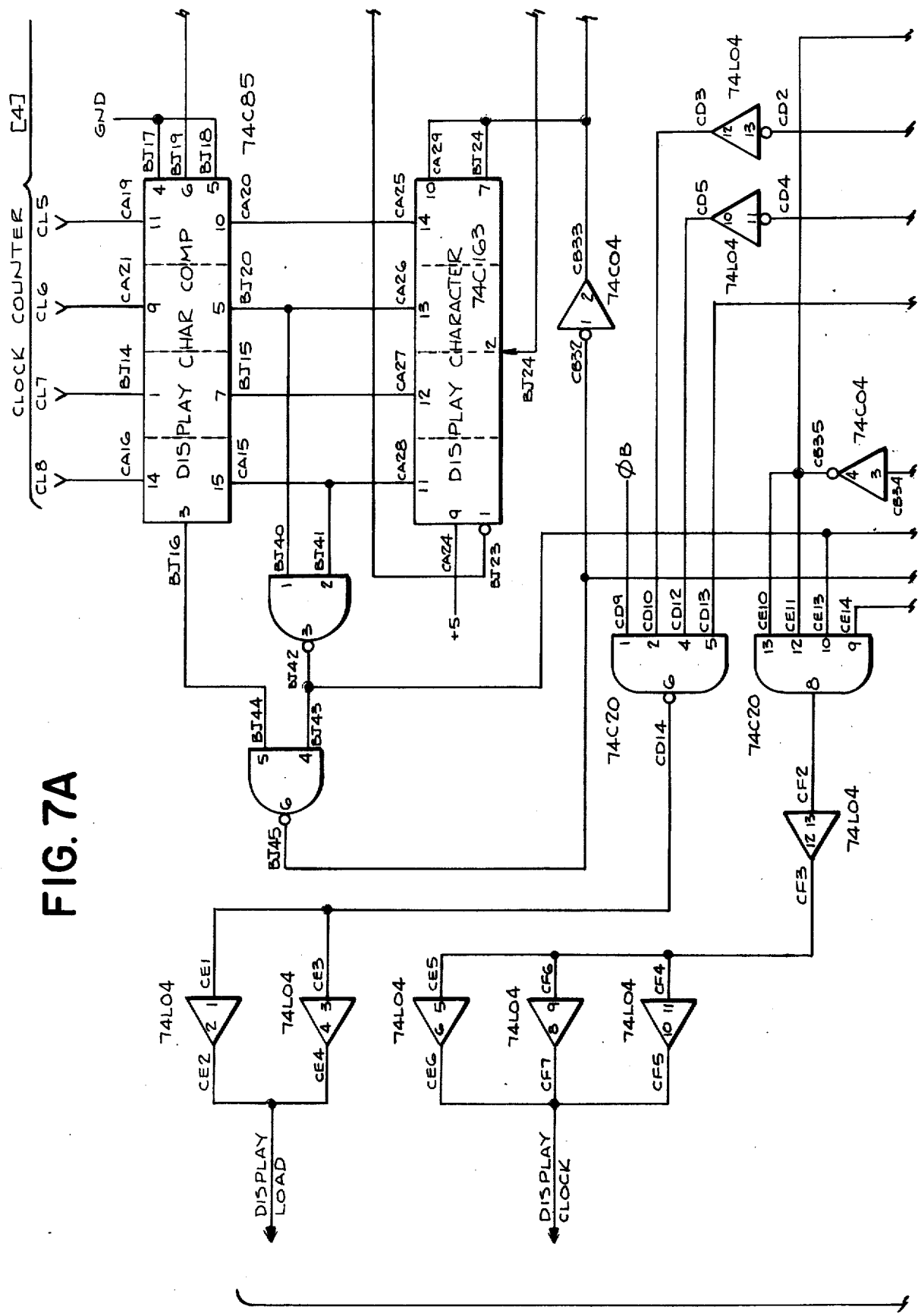
Figure 7B:
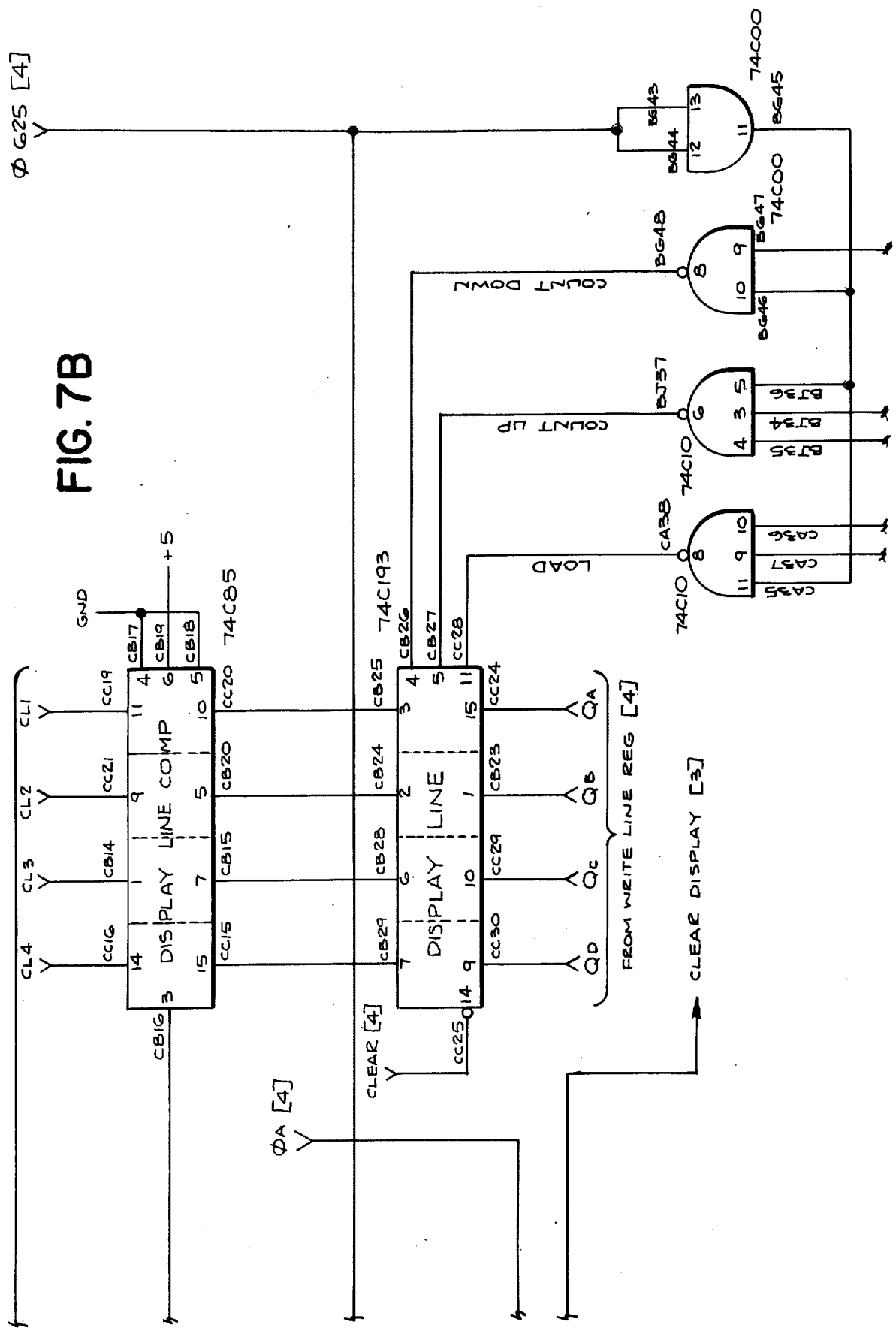
Figure 7C:
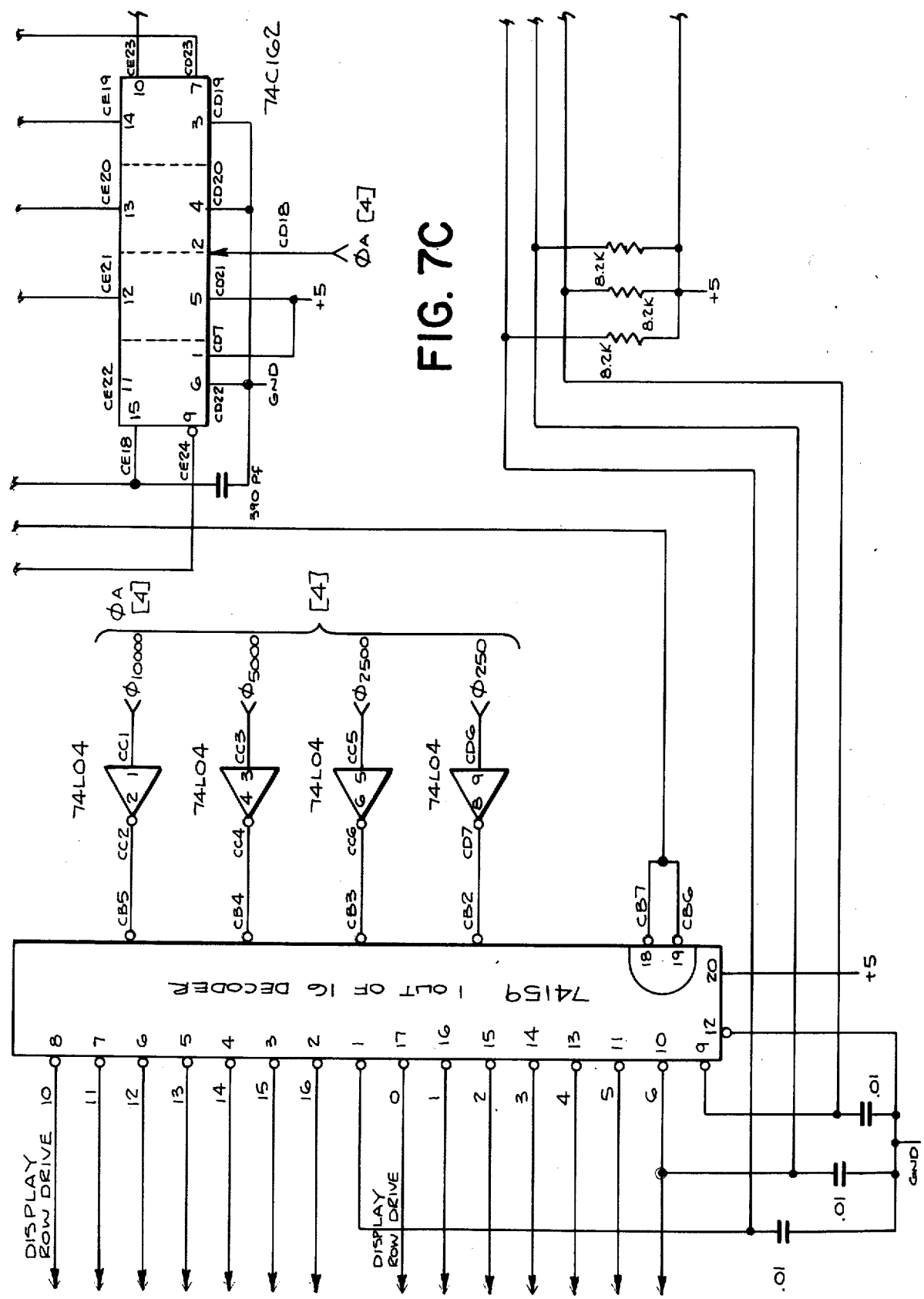
Figure 8:
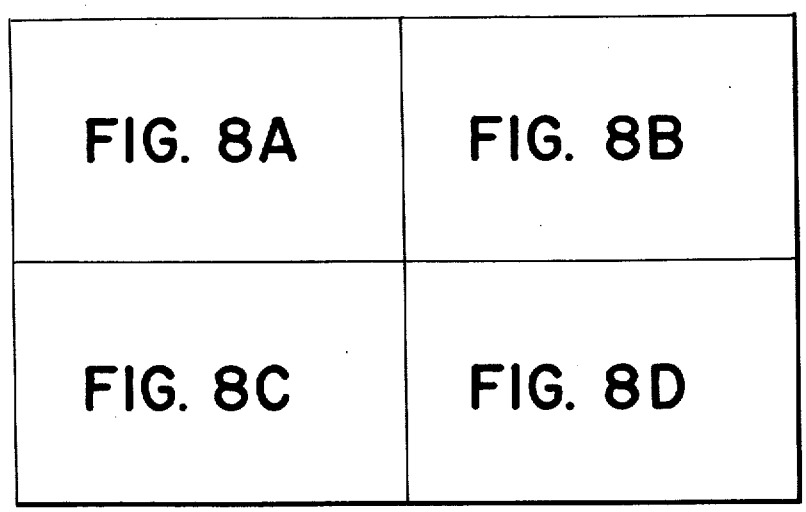
Figure 8B:
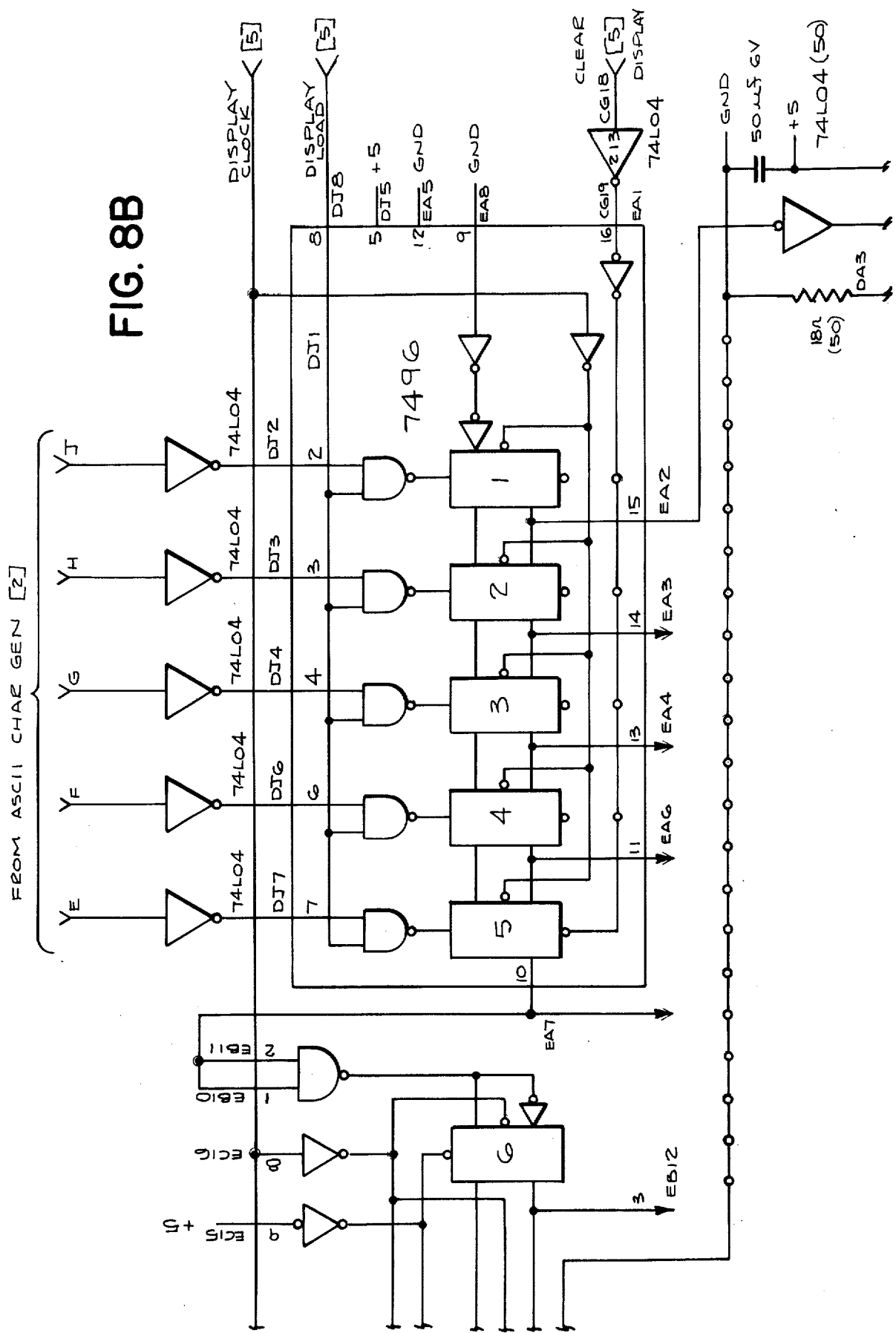
Figure 8D:
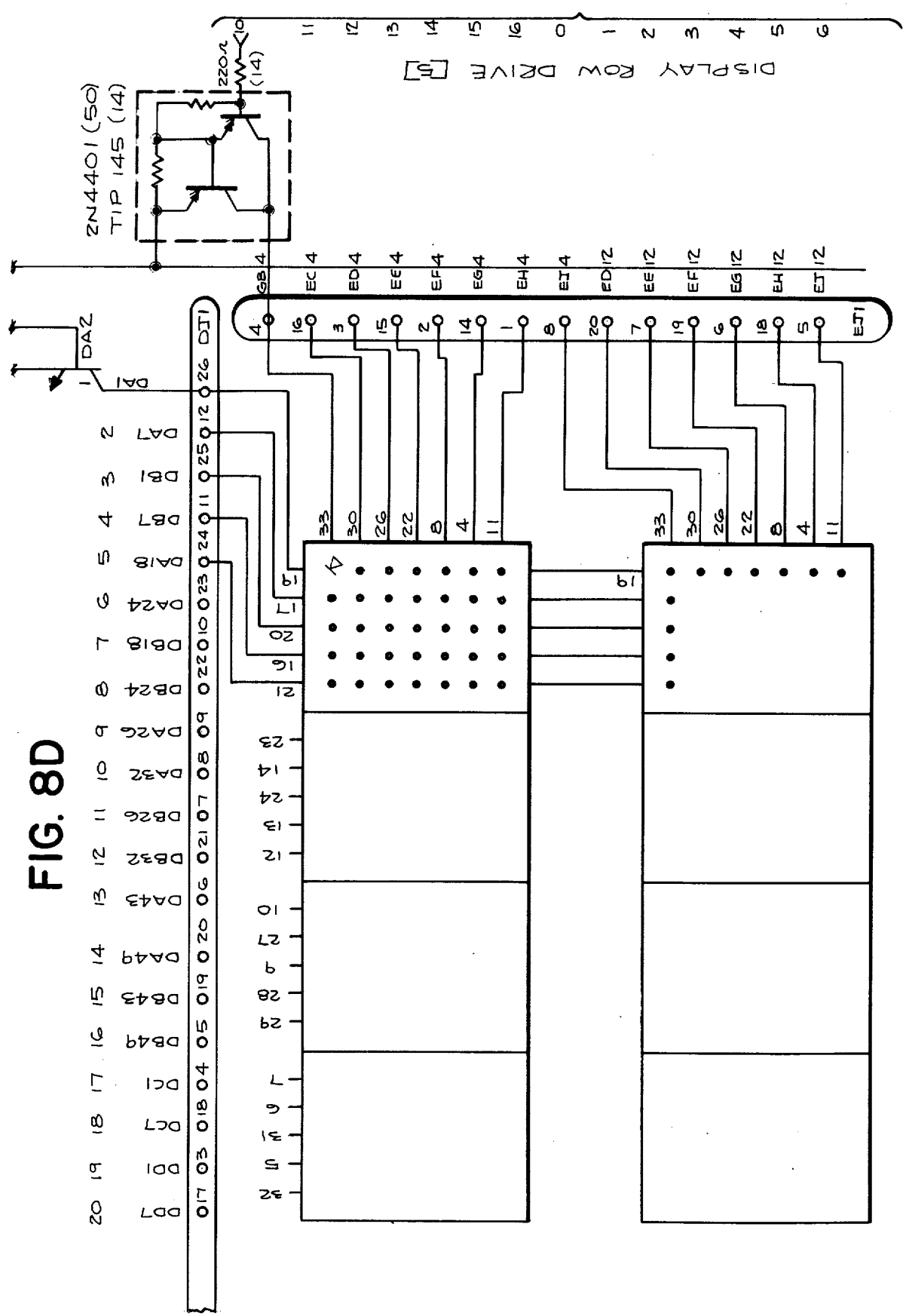

FIGS. 3A, 3B, and 3C are more detailed schematic block diagrams of the interactive hand-held computer terminal shown in FIG. 1, showing the construction and operation of the terminal;

FIG. 3 is a diagram showing how FIGS. 3A, 3B and 3C are put together to form FIG. 3;

FIGS. 4A, 4B, 4C, 4D, and 4E are detailed schematic diagrams of the keyboard, the keyboard encoder and control logic, and the transmitter portion of the universal asynchronous receiver and transmitter shown in FIG. 2;

FIG. 4 is a diagram showing how FIGS. 4A, 4B, 4C, 4D and 4E are put together to form FIG. 4;

FIGS. 5A, 5B, 5C and 5D are detailed schematic diagrams of a portion of the character address controller shown in FIG. 2;

FIG. 5 is a diagram showing how FIGS. 5A, 5B, 5C and 5D are put together to form FIG. 5;

FIGS. 6A, 6B, 6C and 6D are detailed schematic diagrams of the receiver portion of the universal asynchronous receiver and transmitter shown in FIG. 2;

FIG. 6 is a diagram showing how FIGS. 6A, 6B, 6C and 6D are put together to form FIG. 6;

FIGS. 7A, 7B, 7C and 7D are detailed schematic diagrams of a portion of the character address controller and the scroll control circuit shown in FIG. 2;

FIG. 7 is a diagram showing how FIGS. 7A, 7B, 7C and 7D are put together to form FIG. 7;

FIGS. 8A, 8B, 8C and 8D are detailed schematic diagrams of the display system shown in FIG. 2; and FIG. 8 is a diagram showing how FIGS. 8A, 8B, 8C and 8D are put together to form FIG. 8.

DETAILED DESCRIPTION

In FIG. 1, the interactive terminal 20 of this invention is shown being held in the operator's hand ready for operation. Terminal 20 comprises a 20-character alpha-numeric display 22, a top-mounted keyboard 24, side-mounted shift level control keys 26, 27 and 28, all positioned adjacent to each other on one side of terminal 20, and side-mounted scroll switch 30 positioned on the side opposite the three adjacent keys 26, 27 and 28. Terminal 20 also incorporates indicator lights 36, 37 and 38.

Keys 26, 27, 28 and 30 are all conveniently positioned for ease of operation by the operator. Scroll switch 30 is positioned for easy operation by the left-hand thumb of the operator, while keys 26, 27 and 28 are positioned for easy operation by the left-hand index, middle and ring fingers of the operator.

In the embodiment shown in FIG. 1, alpha-numeric display 22 comprises two lines, with each line having a ten-character display capability. As is clearly obvious to one skilled in the art, this is merely one of the infinite number of display possibilities that can be employed in the terminal of this invention. The only limitation on the lines and number of characters in each line which could be employed is dependent only upon the size of each character desired in order to assure easy readability and the size limitation of the terminal itself. In this embodiment, each character comprises a 35-dot (5 × 7) light-emitting diode (LED) matrix. It has been found that by employing the 35-dot matrix a highly readable display is achieved, which is capable of clearly displaying every one of the printable characters in the ASCII code.

In the embodiment shown in FIG. 1, keyboard 24 comprises a 24-key pad, with 20 of the keys representing four different information levels. By incorporating four information levels on each of the 20 keys of the keyboard 24, the 20-key pad is capable of transmitting all of the 75 characters in the ASCII code, while also having sufficient capability for command signals. The operator can quickly and easily select any desired signals by employing side-mounted shift level control keys 26, 27, and 28. As will be more fully discussed below, any of the characters or signals positioned in the lower portion of the key may be transmitted by merely pressing that particular key, while not pressing any of the side-mounted keys. As a result, if the operator wished to enter the number 5, key 31 bearing the number 5 in the lower portion thereof would merely be pushed.

Key 31 also displays the letters J, K and L as three additional characters which key 31 is capable of transmitting. In order to enter the first letter in the series on key 31, namely the letter J, side-mounted key 26 is first pressed, and then key 31 is pressed. In order to enter the second character in the series, in this example the letter K, control key 27 is first pressed and then key 31 is pressed. Similarly, when the last character in the series, in this situation the letter L, is to be entered, side-mounted key 28 is pressed and then key 31 is pressed.

In this very simple and convenient manner, each key of keyboard 24 is capable of separately entering each of the four different characters displayed on the particular key.

By providing terminal 20 with side-mounted keys 26, 27 and 28, which are operated by one hand while the top-mountd keys of keyboard 24 are operated by the other hand, an extremely rapid and efficient interactive hand-held terminal is provided. For added convenience, display lights 36, 37 and 38 are incorporated in order to visually inform the operator which side-mounted key he has pushed. When key 26 is pushed, light 36 will be illuminated, while light 37 indicates that control key 27 has been pushed and light 38 indicates that control key 28 has been pushed. When none of the three indicator lights are on, the character displayed in the lower portion of the key will be transmitted.

Keyboard 24 also incorporates four optional keys positioned in the bottom row of the keyboard. These keys consist of a clear key 32, an A-set key 33, a B-set key 34, and a C-set key 35. This row of keys may be incorporated into terminal 20 in order to allow terminal 20 to be operated without being hand-held. A-set key 33 provides the same latching function as side-mounted key 26, while the B-set key 34 provides the same latching function as control key 27, and the C-set key 35 provides the same function as control key 28. Key 32 labeled "CLEAR" is used to alter any erroneous setting of the other three keys in the row prior to entry of a particular character.

Specifically, if the A-set key were pressed by error when the B-set key was desired, the CLEAR key would be pressed in order to erase the signal presented by the A-set key, and then the B-set key would be pressed in order to obtain the condition desired. As has been previously indicated, this row of keys has been found to be an option which can be incorporated if desired. However, it has been found that greater versatility and speed is obtained with the terminal of this invention by requiring two-handed operation and eliminating this optional row which allows one-handed operation of the terminal. As indicated above, indicator light 36 is interconnected with A-set key 33, in order to indicate the setting of this particular condition. Similarly, indicator light 37 is interconnected with the B-set key 34 and indicator light 38 is interconnected with the C-set key 35 in order to indicate the setting of these particular conditions. Front-mounted keys 33, 34, 35 are latching; that is, depressing one causes the next keyboard character to be in the selected information level transmission code. This mode is cleared after one character is sent, or if the CLEAR key 32 is pressed. This is contrasted with the operation of the side shift keys 26, 27, 28, which must be held down during a keystroke to select a transmission mode.

Terminal 20 also incorporates scroll switch 30, which allows the operator to present on display 22 any of the information which has been stored in the self-contained memory in terminal 20. By maintaining scroll switch 30 in the normal position, the information entered on keyboard 24 or received by terminal 20 is first displayed on the first or lower line of display 22 and when all ten characters of the first line of display 22 are filled the display automatically moves the contents of the first line to the second or upper line of display 22. When the lower line of display 22 has again been filled, the information presented on line *l* is shifted to the upper line of display 22 and the new information is displayed on line *l*, or lower, of display 22. When retrieval of any information stored in the self-contained memory of terminal 20 which is not visually seen on display 22 is desired, scroll switch 30 is moved into the retrieval position, which automatically retrieves on a line-by-line basis the information stored in the memory. When the desired line from the memory storage is displayed, scroll switch 30 is placed in a hold position in order to assure the operator sufficient time to visually read and understand the information displayed. Whenever the operator wishes to return display 22 to show the information presently being received or entered, scroll switch 30 is reset to the normal run position. This automatically presents on display 22 the character information which was last received from the computer interface or entered on the hand-held terminal.

In the embodiment of terminal 20 shown in FIG. 1 and detailed in the following description, only three lines need be connected between terminal 20 and the external systems. These lines represent data in, data out, and power. As discussed above, the terminal of this invention can incorporate its own power source and signal transmitting and receiving means. When such means are incorporated into the terminal or are in a portable self-contained unit to which the terminal is connected, no direct connection between the terminal and the external systems need be made and the hand-held terminal of this invention will be completely portable and functional without any wire length limitations.

The actual operation of interactive terminal 20 is better understood by referring to the schematic block diagram shown in FIG. 2. In FIG. 2, an overall schematic block diagram showing the operation of terminal 20 of this invention is shown. Keyboard 40 incorporates the previously described information level keys, the information level shift keys, and the scroll switch key. Also, keyboard 40 incorporates the three light-emitting diodes for indicating which, if any, of the information level shift keys has been selected.

Keyboard 40 is interconnected to a keyboard encoder and control logic block 42. The keyboard encoder and control logic block 42 receives a signal from keyboard 40, converts the signal into a 6-bit binary signal which represents the information received, and sets a data-ready signal when the 6-bit binary signal is ready for transmission to a universal asynchronous reciever and transmitter 44. As soon as a ready signal is received, keyboard encoder and control logic block 42 transfers the 6-bit binary signal stored therein to registers incorporated in the universal asynchronous receiver and transmitter 44. The universal asynchronous receiver and transmitter 44 incorporates two distinct portions, one being a transmitter portion and one being a receiver portion. The information transferred from the keyboard encoder and control logic 42 is transferred directly into registers located in the transmitter portion. When the proper timing signals have been received this information is transferred along line 46 as serial data to a particular data receiving means 47. Data receiving means 47 can take various forms, such as a frequency shift keying radio receiver, a Modem input, or a computer communication input channel.

The serial data entering the universal asynchronous receiver and transmitter 44 on line 48 is transmitted by data transmitting means 49. Data transmitting means 49 can also take various forms, such as a frequency shift keying radio transmitter, a Modem output, or a computer communication output channel. The serial data entering on line 48 is stored in registers incorporated as part of the receiver portion of receiver-transmitter 44.

When the data stored in the receiver portion of receiver-transmitter 44 is ready for transmission to a character memory 52, a data-ready signal is transmitted from receiver-transmitter 44 to a character address controller 50. Character address controller 50 incorporates a clock oscillator and a clock counter in combination with comparator circuits which determine the timing when the serial data stored in the receiver portion of receiver-transmitter 44 can be transmitted to character memory 52. Character address controller 50 indicates the particular line and the particular character position in that line which the information being transferred from the receiver portion of receiver-transmitter 44 should have when stored in character memory 52, along with the position presently available in memory 52. When comparison is achieved, the data stored in receiver-transmitter 44 is transferred to character memory 52.

Character address controller 50 in combination with scroll circuit 54 controls the readable display associated with display system 56. When the proper timing has been achieved, character address controller 50 signals character memory 52 to transfer the 6-bit digital signal stored in character memory 52 to display systems 56. Display system 56 incorporates an ASCII character font generator which converts the 6-bit digital signal into a signal for illuminating the light-emitting diode of the display. Upon receipt of the proper strobing signals, the display is illuminated with the desired characters and lines.

The particular lines which are presented on the display associated with display system 56 are controlled by scroll control circuit 54, which sets the particular mode for the display. Scroll control circuit 54 allows the operator to select whether the serial data entering on line 48 is immediately displayed by display system 56, whether information stored in character memory 52 is presented by display system 56, or whether one line of display is held constant while the second line shows the serial data entering on line 48. Depending upon the particular mode selected, scroll control circuit 54 indicates the desired mode to character address controller 50, which performs the required timing and comparison functions and informs character memory 52 which information should be transferred and displayed by display system 56.

In the manner described above, the hand-held interactive terminal of this invention efficiently operates without any noise, allowing the operator to enter instructions on his hand-held terminal, have these instructions sent directly to the data-receiving means, while having the information so transmitted to data receiving be displayed on the display associated with terminal 20. Furthermore, the operator is capable of reviewing any of the information contained in the memory associated with terminal 20, allowing the operator to review either instructions that have been sent or information which has been transferred to the terminal by the external data-transmitting means.

A more detailed block diagram showing the operation of the circuitry of the terminal of this invention is shown in FIG. 3. By referring to FIG. 3, greater understanding and insight into the specific operation of the data handling of the terminal of this invention can best be understood. FIG. 3 comprises three drawings, FIG. 3A, FIG. 3B and FIG. 3C, which go together, as shown in the schematic of FIG. 3, to form an operational block diagram.

In FIG. 3A, the specific elements of keyboard 40 and keyboard encoder control logic 42 are shown. Keyboard 40 comprises the 20-key keyboard 24, information level shift keys 26, 27, 28, 33, 34, and 35, and light-emitting diodes 36, 37, and 38.

As discussed above, keyboard 24 incorporates all of the 75 ASCII code characters and control signals which would be required in a terminal, with each key capable of transmitting four different information levels. Shift keys 26, 27, and 28 are used in combination with keyboard 24 to transmit any particular character or command. Information level set key 33 performs the same operational function as side-mounted key 26, while information level set key 34 performs the same function as side key 27, and information level set key 35 performs the same function as side-mounted key 28. Light-indicating diode 36 indicates a selection of key 26 or 33, light indicating diode 37 indicates the selection of key 27 or 34, and light-indicating diode 38 indicates the selection of key 28 or 35. If no light-indicating diode is illuminated, no information level shift key has been engaged, and the character or command appearing on the lower half of the key on keyboard 24 will be transmitted when that key is pressed.

Keyboard encoder and control logic 42 incorporates a keyboard row scanner 60, a keyboard column input 61, a programmable read-only memory 62, an output buffer 63, a timing counter 64, a data-ready flip-flop 65, an exclusive oring logic 66, a latching and exclusive oring logic 67, and a decoding and light driver 68. Keyboard row scanner 60 constantly outputs a signal on four lines to keyboard 24. When a closure in the keyboard is detected, a signal is transmitted to keyboard column input 61.

Exclusive oring logic 66 is driven by information level shift keys 26, 27, and 28, while latching and exclusive oring logic 67 is driven by information level shift keys 33, 34 and 35. Logic blocks 66 and 67 encode and drive code level-select lines 69 and 70. The signals on code level-select lines 69 and 70 are fed into decoding and light driver 68 and keyboard column input 61. The signal on code level-select lines 69 and 70 activates decoder and light-driver 68 to illuminate the particular light-emitting diode. The signal on code level select lines 69 and 70, in combination with the signal from keyboard 24, activates keyboard column input 61 to determine which character or command has been selected for tansmission. Keyboard column input 61 in turn drives programmable read-only memory 62, activating read-only memory 62 to transmit the corresponding 6-bit binary signal to output buffer 63. Upon receipt of this binary signal, output buffer 63 sets a data-ready flip-flop 65.

When set, data-ready flip-flop 65 initiates a signal on line 71, which clears logic blocks 66 and 67, and informs timing circuit 72 on FIG. 3B associated with the universal asynchronous receiver-transmitter 44 that data is ready to be transferred. Timing circuit 72 then drives a transmitter buffer register 73, which accepts the 6-bit binary word from output buffer 63, shown on FIG. 3A. Referring again to FIG. 3B, when transmitter buffer register 73 is loaded, the data is in turn transmitted to transmitter register 74 of the universal asynchronous receiver-transmitter 44. At this time, a data-transmitted flip-flop 79 is set, which clears dataready flip-flop 65.

Before the information in register 74 can be transmitted as data out, a start adder 75 adds a start bit to the 6-bit binary code loaded in register 74, and a stop adder 76 adds a stop bit to this binary signal. Then the entire 8-bit word is transmitted in serial fashion into interfacing amplifier 77, which in turn then drives the external data-receiving means 47.

As described above, the data-receiving means may take many various forms, such as a freqency shift keying radio transmitter, a Modem input, or a computer cmmunication input channel. As is obvious to one skilled in the art, in the manner described above, all of the information entered by the operator on keyboard 24 of the terminal of this invention is transmitted to the particular data-receiving means desired.

In order to perform the entire function required of a terminal, the terminal of this invention must be capable of receiving information transmitted from the particular data-transmitting means and display this information on a readable character display. The receiving function of the terminal of this invention starts with the particular data-transmitting means 49 being employed. As described above, the data-transmitting means 49 can take many various forms, such as a frequency shift keying radio receiver, a Modem output, or the computer communication output channel. The Serial data being received by the terminal of this invention on line 48 is fed into an interfacing amplifier 78 which converts the signal to the proper logic level. The information is then transmitted to serial-receiving register 80 located within the universal asynchronous receiver-transmitter 44. When register 80 is filled, the 8-bit binary word is transmitted in parallel into a receiver buffer 81. When receiver buffer 81 is filled, a data-ready flip-flop 82 is set.

The information held in receiver buffer 81 is to be stored in character memory 52. Character memory 52 can take many various forms and sizes and, in the embodiment herein disclosed, character memory 52 comprises six, 100-bit recirculating shift registers 85 which are interlaced to provide memory capability for 100 ASCII characters. The operation and reason for storing the characters in this interlaced manner will become apparent from the description below.

Transfer of the information stored in receiver buffer 81 to character memory 52 is controlled by character address controller 50. Character address controller 50 receives its clocking pulses from a clock oscillator 86, which in the preferred embodiment runs at approximately 1 megahertz. These clock pulses are fed into a long, many-bit clock counter 87, on FIG. 3C, which divides down by a factor of about 9,600. In the preferred embodiment, a clock counter 87 comprises four 4-bit clock counters.

The least significant bits of clock counter 87 are fed into comparator 88 and compared against the contents of a 4-bit decade write character register 89 and a 4-bit decade write line register 90. When a coincidence between the clock count and the write register 89 and the write line register 90 is detected by comparator 88, the signal produced is gated against the data-ready signal from flip-flop 82, causing the data in receiver buffer 81 to be strobed into recirculating shift registers 85 of character memory 52. As each character is received in character memory 52, at the time comparator 88 initiates a data-transfer signal, write character register 89 is incremented by one.

The 4-bit decade write character register 89 and the 4-bit decade write line register 90 maintain the particular address for the positions of the data being loaded into character memory 52. Since character memory 52 comprises six, 100-bit recirculating shift registers which are connected in parallel, the data storage function is accomplished in an interleaving fashion, using all six recirculating shift registers 85 for one bit of the 6-bit character word. Successively receied characters are not in adjacent positions in the shift-register memory, but are separated by a number of positions equal to the total number of memory lines. This interleaving of the recirculating shift registers 85 provides the system with sufficient time to obtain the data from character memory 52 for transmission to the display system 56.

Write character register 89 and write line register 90 maintain the particular character position and line position available for loading in character memory 52 and, when clock counter 87, which drives recirculating registers 85 of character memory 52, reaches a count indicating that the desired position in character memory 52 is now available to be loaded, comparator 88 initiates the data transfer signal. When ten characters have been received and written into character memory 52, write character register 89 increments write line register 90 by one.

Character address controller 50 also incorporates write control logic 94, which provides over-riding signals to write character register 89 and write line register 90. By initiating a particular signal on the keyboard of the terminal, the operator can initiate a carriage return signal which, when decoded by write control logic 94, will cause write character register 89 to return to the zero position. Other over-riding controls incorporated in write control logic 94 comprise an invalid character detection to prevent the receiving function from hanging up should a garbled or invalid character be received. Also, write control logic 94 incorporates a line feed control which, when detected, initiates a signal to write line register 90 to increment write line register 90 by one.

Character address controller 50 also incorporates a power-up clear delay 95. The output of power-up clear delay 95 on line 96 clears all status flops, registers, and character memory 52. This insures that each time power is applied to the terminal of this invention, the information in character memory 52 is completely erased. Means are provided to erase each character in the store before it is written. This insures that the display line will not display previously stored information before new information is written.

The recovery of the information stored in character memory 52 for transmission to display system 56 can best be understood to FIGS. 3B and 3C. The least significant bits of the four 4-bit clock counter 87 are fed into a comparator 97, which compares this signal to the signals received from a 4-bit decade display character register 98 and a 4-bit decade display line register 99. The display character register 98 and the display line register 99 contain the particular character and line position for which display is desired. When equality is achieved in comparator 97, this indicates that the desired character and line position is now available for loading. In order to achieve the particular character display desired, a read-only memory (ASCII character font generator) 100 is employed. The font generator 100 receives the 6-bit binary signal representing the particular character desired and a row select from clock counter 87, and outputs a 5-bit signal repesenting the actual number of diodes which must be illuminated, in order to visually present the character desired on the display 22. As earlier discussed, each character comprises a 35-dot light-emitting diode matrix. The 35 dots are formed by five vertical rows, each containing seven light-emitting diodes. The font generator 100 produces a 5-bit signal containing in each bit the number and position of the light-emitting diodes which must be illuminated in that particular vertical row in order to produce the desired character display.

When comparator 97 obtains equality, a load signal is transmitted to a load and shift control 101 and to a 50-bit shift register 102. This causes the font generator 100 to load the 5-bit shift register 102. Load and shift controller 101 also receives clocking pulses from clock oscillator 86 and, after the 5-bit signal is loaded into a 50-bit shift register 102, load and shift control 101 signals 50-bit shift register 102 to shift over five bits. The timing for this shift operation is achieved due to the interlacing technique employed in character memory 52, as fully discussed above. This loading and shift process continues until the information for ten characters has been completely transferred, thereby fully loading 50-bit shift register 102.

The ten characters on the desired line are visually presented on display 22 by means of a 50-column driver 103 and a 14-row driver 104. 50-column driver 103 is driven by 50-bit shift register 102, which determines whether the seven light-emitting diodes associated with each of the fifty columns in a particular line of display 22 are either on or off in order to visually present desired characters. Each of the fourteen rows associated with the two lines of display 22 are sequentially excited by means of a one-out-of-sixteen decoder 105 and a 14-row driver 104. The one-out-of-sixteen decoder 105 is driven by the most significant bits of clock counter 87. This causes one of the rows of row driver 104 to be excited. As a result, the ten characters on each of the two lines of display 22 are visually presented to the operator. The character generator 100 row select is operated in synchronism with MSB of clock and the row driver.

The hand-held interactive terminal of this invention also incorporates a scroll control circuit 54. As described above, the terminal of this invention incorporates a finger-operated three-position scroll switch 30, having a normal position 30A, a scroll position 30B, and a scroll-advance position 30C. These positions are interconnected with a scroll timing and logic 106. Scroll positions 30A, 30B and 30C control display line register 99, which in conjunction with display character register 98 and comparator 97 determine which word is being read out of character memory 52. When scroll switch 30 is in the normal position 30A, the display line register 99 at the beginning of the raster or sweep of the display is loaded with the contents of the write line register 90. The line being written will then appear in the lower line of the ten characters in the display. When the first line of the ten characters has been swept by the raster, an output signal from the one-out-of-sixteen decoder 105 is transmitted to scroll timing and logic 106. This causes the display line register 99 to count down by one. This causes the line which was previously written into character memory 52 to be displayed in the upper line of the output display 22. After the lower line of output display 22 has been swept by the raster, a signal will be produced from one-out-of-sixteen decoder 105, which is transmitted to scroll timing and logic 106, causing the contents of the write line register 90 to be loaded into the display line register 99 once again. In this fashion, it can be seen that if the scroll switch is in normal position 30A, the display line will be loaded alternatively with the content of write line register 90 and then it will count down by one, bringing the previously written line into output display 22.

When scroll switch 30 is placed in scroll position 30B, the line which was being written at the time the switch was moved into scroll position 30B will be displayed in the lower line of display 22. The upper line will display the previously written line. This condition will continue indefinitely until the scroll-select position has been changed. When scroll switch 30 has been placed in the scroll-advance position 30C, the display line register 99, instead of alternatively being caused to count down by one and then count up by one, will count down by two and count up by one. This will in effect move the most recently previously written line into display and the line previously written before that into display. Each movement of the scroll-advance switch will in effect cause the lines previously written which are stored in character memory 52 to be moved into the display position. After this scrolling technique has been completed as far as the operator wishes, or until the scroll has looped around all ten lines, returning the scroll switch to the normal position will again cause the line which is now being written to be displayed in the lower line of the display and the line previously written to be displayed on the upper line of the display.

For ease of reading and continuity, it has been found that in the preferred embodiment, in the two-line positions discussed above, the line being written appears on the lower line and the lines previously written appear on the upper line. This has been done in order to simulate the same condition which is effectuated by normal typing in a manner similar to rolling a piece of paper back to see what has been previously written. These could be interchanged.

As would be obvious to one skilled in the art, a position indicator can b incorporated into display 22 in order to quickly inform the operator of the position which is next available for entering of a character. Also, in the system described in the specification, a full duplex operation has been discussed. In other words, the information presented on display 22 is the information which has been entered by the operator, sent to the interfacing data-receiving means, and returned by the data-transmitting means to the hand-held terminal. In this way, the operator is able to see only the information which has been received and re-transmitted by the system to which he is sending information. As would be obvious to one skilled in the art, this information display can be altered in order to immediately display the data entered by the operator regardless of whether or not it has been received by the data-receiving means. It has been found that the full duplex situation employed in the embodiment described above provides a greater confidence in the transmission of the proper information and also allows the operator to go ahead while the computer is working on a response. This operational mode can of course be altered by well-known Modem systems commercially available in the art, which allows local, half-duplex and full-duplex operation. As will be obvious to one skilled in the art, the selection of a local, half-duplex or full-duplex operation can be incorporated into the hand-held terminal and selected directly by switch means provided on the terminal instead of by means associated with equipment such as a Modem unit.

Another alternative embodiment for the terminal of this invention is to provide one of the keys on keyboard 24 with a separate command-latching function. In this way, any one or all of the remaining 19 keys could have specific, multiple, command signals associated with them which could only be activated when the overriding latching command key has been engaged. In his way, the relatively small, a 20-key keyboard of the terminal of this invention would have the capability of transmitting the entire 128-character ASCII codes and major command signals while also being able to transmit virtually any other command signal desired.

Another alternative embodiment for the terminal is to provide "horizontal scroll" to expand the visual window to allow for data formatting.

FIG. 4, which consists of FIGS. 4A-4E, shows a more detailed electrical diagram of the keyboard 40, the keyboard encoder and control logic 42, and the transmitter portion of the universal asynchronous receiver and transmitter 44. Using these detailed drawings, it would be obvious to one skilled in the art how to construct these portions of the terminal of this invention.

FIG. 5, which consists of FIGS. 5A-5D, shows a more detailed electrical diagram of a portion of the character address controller 50. Using these detailed drawings, it would be obvious to one skilled in the art how to construct this portion of the terminal of this invention.

FIG. 6, which consists of FIGS. 6A-6D, shows a more detailed electrical diagram of the receiver portion of the universal asynchronous receiver and transmitter 44 and the character memory 52. Using this detailed drawings, it would be obvious to one skilled in the art how to construct these portions of the terminal of the invention.

FIG. 7, which consists of FIGS. 7A-7D, shows a more detailed electrical diagram of a portion o the character address controller 50 and scroll control circuit 54. Using these detailed drawings, it would be obvious to one skilled in the art how to construct these portions of the terminal of this invention.

FIG. 8, which consists of FIGS. 8A-8D, shows a more detailed electrical diagram of the display system 56. Using these detailed drawings, it would be obvious to one skilled in the art how to construct these portions of the terminal of this invention.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. An interactive terminal, for communication with external data processing means, comprising:
   A. an alpha-numeric display for visually presenting data received and transmitted;
   B. a data memory communicating with said display for storage of at least a portion of information received and transmitted;
   C. an information entry keyboard operable by the user's first hand wherein each of a plurality of said keys represents the transmission of "$n$" different information levels, "$n$" being an integer greater than 1;
   D. at least "$n-1$" shift level control keys simultaneously operable by the user's second hand for selecting the desired information level for transmission of all "$n$" information levels;
   E. information transmission means communicating with said keyboard and said shift level control keys for transmitting selected keyboardinformation to at least said external data processing means;
   F. information receiving means communicating with said external data processing means and said data memory for receipt of information; and
   G. housing means dimensioned for the palm of the user's second hand having a front face dimensioned for mounting said keyboard, and at least one side dimensioned for mounting said shift level control keys;

whereby the fingers of the user's second hand select desired shift level control keys and the user's first hand selects desired keys of the information entry keyboard.

2. An interactive terminal as defined in claim 1, wherein the plurality of keys of said information entry keyboard represent four different information levels and these four information levels are selectable by three shift level control keys.

3. The interactive terminal as defined in claim 1, further comprising:
   H. scroll switching means communicating with said memory for presenting on said display data held in said memory.

4. The interactive terminal as defined in claim 3, wherein said scroll switching means incorporates a three-position switch having a normal position for displaying data as received, a scroll retrieval position for sequentially displaying data held in said memory, and a scroll position for holding data on the display.

5. The interactive terminal as defined in claim 4, wherein said housing means further comprises at least one additional side for mounting the three-position switch so as to be operable by the thumb of the user's second hand.

6. The interactive terminal as defined in claim 2, further comprising:
   H. at least one indicator light energized by one of said shift keys for visually indicating the selection of that particular key.

7. the interactive terminal as defined in claim 1, wherein said data memory comprises six recirculating shift registers connected in parallel for storing information transmitted to the memory.

8. The interactive terminal as defined in claim 1, wherein said display comprises at least two rows of ten indicia generating matrices.

9. The interactive terminal of claim 8, wherein a first of said rows displays currently desired information, and a second of said rows displays the next preceding currently desired information.

10. An interactive terminal as defined in claim 8, wherein said second row is placed directly above said first row.

11. The interactive terminal as defined in claim 8, wherein each of said matrices comprises 35-light-emitting diodes.

12. The interactive terminal as defined in claim 1, further comprising:
   H. keyboard encoder and control logic means communicating with said keyboard and said shift level control keys for generating a corresponding 6-bit binary word;
   I. transmitting means accepting the 6-bit binary word from said encoder and control logic means, incorporating means for adding a start bit and a stop bit to said binary word, and transmitting the resultant 8-bit binary word to the external data processing means;
   J. receiving means accepting an 8-bit binary word from the external data processing means, incorporating first means for masking the first and last bit of said binary word, and second means for transferring the 6-bit information portion of said word to memory in response to a memory transfer signal; and
   K. character address control means for determining available positions in said memory and incorporating second means for generating said memory transfer signal when the determination of available space in memory is made.

13. The interactive terminal as defined in claim 12, wherein said character address control means further incorporates third means for determining the desired information to be displayed and fourth means for generating a display word transfer signal, said memory further incorporating a means for receiving said display transfer signal and transferring the corresponding 6-bit binary word in response to said signal, and the terminal also incorporates:
   L. a display driver system communicating with said memory for receiving said 6-bit binary word and generating a 5-bit character display signal which drives said alpha-numeric display.

14. An interactive terminal, for communication with external data processing means, comprising:
   A. an alpha-numeric display for visually presenting data received and transmitted;
   B. a data memory communicating with said display for storage of at least a portion of information received;
   C. an information entry keyboard operable by the user's first hand wherein each of a plurality of said keys represents the transmission of "$n$" different information levels, "$n$" being an integer greater than one;
   D. at least "$n-1$" shift level control keys simultaneously operable by the user's second hand for selecting the desired information level for transmission of all "$n$" information levels;
   E. information transmission means communicating with said keyboard and said shift level control keys for transmitting selected keyboard information to at least said external data processing means;

F. information receiving means communicating with said external data processing means and said data memory for receiving of information;

G. scroll switching means communicating with said memory for presenting on said display data held in said memory;

H. a housing having:
1. a front face dimensioned for mounting said display and said information entry keyboard,
2. a first side dimensioned for mounting said shift level control keys so as to be operable by the fingers of the user's second hand,
3. a second side dimensioned for mounting said scroll switching means so as to be operable by the thumb of the user's second hand, and
4. an interior space dimensioned for containing said data memory, information transmission means, and information receiving means;

whereby the fingers of the user's second hand select desired shift level control keys and the user's first hand selects desired keys of the information keyboard and the thumb of the user's second hand operates the scroll switching means.

15. An interactive terminal as defined in claim 14, wherein the plurality of keys of said information entry keyboard represent four different information levels and these four information levels are selectable by three shift level control keys.

16. An interactive terminal as defined in claim 14, wherein said scroll switching means incorporates a three-position switch having a normal position for displaying data as received, a scroll retrieval position for sequentially displaying data held in said memory, and a scroll position for holding data on the display.

17. An interactive terminal as defined in claim 14, wherein said display comprises a first row of indicia generating matrices for displaying currently desired information, and a second row of indicia generating matrices positioned directly above said first row, for displaying the next preceding currently desired information.

18. An interactive terminal operable in at least four information levels, for communication with external data processing means, comprising:
A. an alpha-numeric display for visually presenting data received and transmitted,
B. a data memory communicating with said display for storage of information received and transmitted;
C. shift means operable to select any one of said information levels;
D. an information entry keyboard operable by the user's first hand, incorporating at least twelve keys arranged in a 4 × 3 matrix wherein each number from 0 to 9 is individually selectable by operation of a corresponding individual key of the twelve keys when the first information level is selected and wherein the letters from A to Z are divided into first, second, and third mutually exclusive groups, each group having less than thirteen letters, wherein each letter of the first group of letters is individually selectable by operation of a corresponding individual key of said keyboard when the second information level is selected, wherein each letter of the second group of letters is individually selectable by operation of a corresponding individual key of said keyboard when the third information level is selected, and wherein each letter of the third group of letters is individually selectable by operation of a corresponding individual key of said keyboard when the fourth information level is selected;
E. information transmission means communicating with said keyboard and said shift level control keys for transmitting selected keyboard information to at least said external data processing means;
F. information receiving means communicating with said external data processing means and said data memory for receipt of information;
G. housing means dimensioned for the palm of the user's second hand having a front face dimensioned for mounting said keyboard, and at least one side dimensioned for mounting said shift means;

whereby the fingers of the user's second hand select the desired information level by operation of said shift means and the user's first hand selects desired keys of the information entry keyboard.

19. An interactive terminal as defined in claim 18, wherein said shift means incorporate shift level control keys, the number of shift level control keys at least equal to the number of information levels minus 1.

20. An interactive terminal as defined in claim 19, further comprising a three-position scroll switch communicating with said memory for presenting on said display data held in said memory, having a normal position for displaying data as received, a scroll retrieval position for sequentially displaying data held in said memory, and a scroll position for holding data on the display.

21. The interactive terminal as defined in claim 20, wherein said housing means further comprises at least one additional side for mounting the three-position switch so as to be operable by the thumb of the user's second hand.

22. An interactive terminal, for communicating with external data processing means, comprising:
A. an alpha-numeric display for visually presenting data received and transmitted;
B. a data memory communicating with said display for storage of information received and transmitted;
C. an information entry keyboard operable by the user's first hand wherein each of a plurality of said keys represents a transmission of "$n$" different information levels; "$n$" being an integer greater than 1;
D. shift level control keys operable by the user's second hand for selecting the desired information level for transmission of all "$n$" levels, wherein the minimum number of shift level control keys is determined by the two following formulae depending upon the value of "$n$",
1. ($\log_2 n$), for "$n$" equal to an integral value of 2, and
2. (1 + the truncated value of $\log_2 n$) for "$n$" not equal to an integral value of 2;
E. information transmission means communicating with said keyboard and said shift level control keys for transmitting selected information to at least said external data processing means;
F. information receiving means communicating with said external data processing means and said data memory for receipt of information; and
G. housing means dimensioned for the palm of the user's second hand, having a front face dimensioned for mounting said keyboard, and at least one side dimensioned for mounting said shift level control keys so as to be operable by the user's second hand when holding said housing means;

whereby the fingers of the user's second hand select desired shift level control keys and the other hand selects desired keys of the information entry keyboard.

23. An interactive terminal as defined in claim 22, further comprising:
   H. scroll switching means communicating with said memory for presenting on said display any data held in said memory.

24. The interactive terminal as defined in claim 23, wherein said scroll switching means incorporates a three-position switch having a normal position for displaying data as received, a scroll retrieval position for sequentially displaying data held in said memory, and a scroll position for holding data on the display.

25. An interactive terminal, for communicating with an external data receiving means, comprising:
   A. an alpha-numeric display for visually presenting data transmitted;
   B. a data memory communicating with said display for the storage of at least a portion of the information transmitted;
   C. an information entry keyboard operable by the user's first hand wherein each of a plurality of said keys represents the transmission of "$n$" different information levels, "$n$" being an integer greater than 1;
   D. at least "$n-1$" shift level control keys simultaneously operable by the user's second hand for selecting the desired information level for transmission of all "$n$" information levels;
   E. information transmission means communicating with said keyboard and said shift keys for transmitting selected keyboard information to said data receiving means; and
   F. housing means dimensioned for the palm of the user's second hand having a front face dimensioned for mounting said keyboard, and at least one side dimensioned for mounting said shift level control keys;

whereby the fingers of the user's second hand select desired shift level control keys and the user's first hand selects desired keys of the information entry keyboard.

26. An information signal generator, comprising:
   A. an information entry keyboard operable by the user's first hand wherein each of a plurality of said keys represents the transmission of "$n$" different information levels, "$n$" being an integer greater than 1;
   B. shift level control keys operable by the user's second hand for selecting the desired information level for generation of "$n$" information levels wherein the minimum number of shift level control keys is determined by the two following formulae depending upon the value of "$n$",
      1. ($\log_2 n$), for "$n$" equal to an integral power of 2, and
      2. ($1 +$ truncated value of $\log_2 n$), for "$n$" not equal to an integral power of 2;
   C. a signal-generating circuit responsive to simultaneous operation of the shift level control keys and the keyboard for generating a signal corresponding to the information represented by operation of the selected key of the keyboard and the selection of an information level by operation of the shift level control keys; and
   D. a housing dimensioned for the palm of the user's second hand, having a front face dimensioned for mounting said keyboard and at least one side dimensioned for mounting said shift level control keys so as to be operable by the fingers of the user's second hand when holding said housing;

whereby the fingers of the user's second hand select desired shift level control keys and the other hand selects desired keys of the information entry keyboard.

27. An information generator as defined in claim 26, wherein the plurality of keys of said keyboard represent four information levels and these four information levels are selectable by three shift level control keys.

28. An information signal generator operable in at least four information levels, comprising:
   A. shift means operable to select any one of said information levels;
   B. a keyboard operable to select desired information, incorporating twelve keys arranged in a four by three matrix wherein each number of from 0 to 9 is individually selectable by operation of a corresponding individual key of the twelve keys when the first information level is selected and wherein the letters from A to Z are divided into first, second and third mutually exclusive groups, each group having less than thirteen letters, wherein each letter of the first group of letters is individually selectable by operation of a corresponding individual key of said keyboard when the second information level is selected, wherein each letter of the second group of letters is individually selectable by operation of a corresponding individual key of said keyboard when the third information level is selected, and wherein each letter of the third group of letters is individually selectable by operation of a corresponding individual key of said keyboard when the fourth information level is selected; and
   C. a signal-generating circuit responsive to simultaneous operation of the shift means and the keyboard for generating a signal corresponding to the information represented by operation of the selected key of the keyboard and the selection of an information level by operation of the shift means.

29. An information signal generator as defined in claim 28, wherein said keyboard further incorporates additional keys representing arithmetic operators.

30. An information signal generator as defined in claim 28, wherein said shift means incorporate two-position shift keys.

31. An information generator as defined in claim 30, further comprising:
   D. housing means dimensioned for the palm of the user's hand having a front face dimensioned for mounting said keyboard, and at least one side dimensioned for mounting said shift keys;

whereby the fingers of one of the user's hands selects the desired shift keys and the fingers of the user's other hand selects the desired keys of the keyboard.

32. An information generator as defined in claim 28, wherein said keyboard further incorporates additional keys representing punctuation symbols.

* * * * *

UNITED STATES PATENT AND TRADEMARK OFFICE
CERTIFICATE OF CORRECTION

PATENT NO. : 4,005,388
DATED : January 25, 1977
INVENTOR(S) : Richard E. Morley and George G. Schwenk It is certified that error appears in the above-identified patent and that said Letters Patent are hereby corrected as shown below:

Page 1 of 2

Column 5, line 53, cancel "reciever" and substitute therefor --receiver--
Column 5, line 3, cancel "$\ell$" and substitute therefor --1--
Column 5, line 5, cancel "$\ell$" and substitute therefor --1--
Column 6, line 33, cancel "systems" and substitute therefor --system--
Column 7, line 57, cancel "tansmission" and substitute therefor --transmission--
Column 8, line 16, cancel "freqency" and substitute therefor --frequency--
Column 8, line 18, cancel "cmmunication" and substitute therefor --communication--
Column 8, line 66, insert --character-- before "register"

Column 9, line 15, cancel "receied" and substitute therefor --received--
Column 9, line 60, insert --by referring-- before "to FIGS."
Column 10, line 7, cancel "repesenting" and substitute therefor --representing--
Column 10, line 21, insert --signal into 50-bit-- before "shift"

Column 12, line 18, cancel "his" and substitute therefor --this--
Column 12, line 19, cancel "a" before "20-key"

Column 12, line 43, cancel "this" and substitute therefor --these--

UNITED STATES PATENT AND TRADEMARK OFFICE
CERTIFICATE OF CORRECTION

PATENT NO. : 4,005,388

DATED : January 25, 1977

INVENTOR(S) : Richard E. Morley and George G. Schwenk

It is certified that error appears in the above-identified patent and that said Letters Patent are hereby corrected as shown below:

Column 12, line 48, cancel "o" and substitute
    therefor --of--

Column 13, line 17, cancel "n-$\ell$" and substitute
    therefor --n-1--

Column 13, line 23, cancel "keyboardinformation" and
    substitute therefor --keyboard information"

Column 13, line 57, cancel "2" and substitute therefor
    --1--

Column 13, line 62, cancel "the" and substitute
    therefor --The--

Column 14, line 5, cancel "8" and substitute
    therefor --9--

Signed and Sealed this sixteenth Day of August 1977

[SEAL]

Attest:

RUTH C. MASON
*Attesting Officer*

C. MARSHALL DANN
*Commissioner of Patents and Trademarks*